(12) United States Patent
Curtin

(10) Patent No.: US 11,542,086 B2
(45) Date of Patent: Jan. 3, 2023

(54) PACKAGING APPARATUS FOR FILM INFLATION AND METHOD THEREOF

(71) Applicant: Better Packages, Inc., Ansonia, CT (US)

(72) Inventor: Michael Curtin, Fairfield, CT (US)

(73) Assignee: BETTER PACKAGES, INC., Ansonia, CT (US)

( * ) Notice: Subject to any disclaimer, the term of this patent is extended or adjusted under 35 U.S.C. 154(b) by 261 days.

(21) Appl. No.: 16/530,440

(22) Filed: Aug. 2, 2019

(65) Prior Publication Data
US 2020/0039721 A1 Feb. 6, 2020

Related U.S. Application Data

(60) Provisional application No. 62/714,853, filed on Aug. 6, 2018.

(51) Int. Cl.
*B65D 81/05* (2006.01)
*B65H 20/02* (2006.01)
(Continued)

(52) U.S. Cl.
CPC ......... *B65D 81/052* (2013.01); *B31D 5/0073* (2013.01); *B65B 51/30* (2013.01);
(Continued)

(58) Field of Classification Search
CPC .......... B29C 66/91213; B29C 66/4326; B29C 66/91216; B29C 66/83423; B29C 66/439;
(Continued)

(56) References Cited

U.S. PATENT DOCUMENTS 3,136,467 A * 6/1964 Olson ................... G06K 13/22
226/177
3,687,789 A 8/1972 Wheeler
(Continued)

FOREIGN PATENT DOCUMENTS

CA         2477997 C     10/2007
KR    20100024842 A  *  3/2010

OTHER PUBLICATIONS

European Patent Office; partial search report cited in EP Patent Application No. 19190121.4, completed Jan. 15, 2020; 9 pages.
(Continued)

*Primary Examiner* — Thomas M Wittenschlaeger
(74) *Attorney, Agent, or Firm* — Jeffrey R. Gray; Moore & Van Allen PLLC

(57) ABSTRACT

A packaging apparatus with an improved pinch roller apparatus, fluid supply apparatus, and/or a sealing apparatus. The pinch roller apparatus (e.g., comprising one or more guide and/or pinch rollers) is used to deliver film material to the fluid supply apparatus (e.g., nozzle and blower apparatus, or the like) that fills one or more chambers of the film material with fluid (e.g., air, gas, or other like fluid), and the film material is then sealed by a sealing apparatus (e.g., using one or more heating elements with an improved temperature sensor configuration) that seals the fluid within the one or more chambers in order to form the inflated article (e.g., inflated packaging material). In particular, the sealing apparatus provides improved sealing through the improved accuracy of the temperature reading in the heating zone, in part, by locating a sensor between a heating element and a protective member that covers the sensor.

20 Claims, 18 Drawing Sheets

(51) Int. Cl.
  *B31D 5/00* (2017.01)
  *G01K 7/02* (2021.01)
  *B65B 51/30* (2006.01)
  *B29C 65/22* (2006.01)
  *B29C 65/00* (2006.01)
  *B29L 22/02* (2006.01)

(52) U.S. Cl.
  CPC .............. *B65H 20/02* (2013.01); *G01K 7/02* (2013.01); *B29C 65/22* (2013.01); *B29C 66/4326* (2013.01); *B29L 2022/02* (2013.01); *B31D 2205/0023* (2013.01); *B31D 2205/0058* (2013.01)

(58) Field of Classification Search
  CPC ........... B29C 66/1122; B29C 66/91421; B29C 65/224; B29C 65/7891; B29C 65/22; B65B 57/08; B65B 41/16; B65B 51/30; B65B 51/32; B65B 51/303; B65B 39/00; B65B 2051/105; B31D 2205/0082; B31D 2205/0064; B31D 2205/0047; B31D 2205/0076; B31D 2205/0088; B31D 2205/0023; B31D 2205/0058; B31D 5/0073; B29L 2022/02; B65H 20/02; B65D 81/052
  See application file for complete search history.

(56) References Cited

U.S. PATENT DOCUMENTS

| | | | |
|---|---|---|---|
| 3,947,656 A * | 3/1976 | Lodi | B29C 65/18 |
| | | | 219/243 |
| 4,017,351 A | 4/1977 | Larson et al. | |
| 4,136,502 A * | 1/1979 | Shore | B65B 31/06 |
| | | | 53/493 |
| 4,439,263 A | 3/1984 | Harkigg et al. | |
| 4,502,906 A | 3/1985 | Young et al. | |
| 4,803,877 A * | 2/1989 | Yano | B65H 20/02 |
| | | | 100/162 B |
| 4,856,260 A | 8/1989 | Woo et al. | |
| 5,239,808 A * | 8/1993 | Wells | B29C 65/228 |
| | | | 53/512 |
| 6,003,288 A | 12/1999 | Sperry et al. | |
| 6,038,839 A | 3/2000 | Linkiewicz | |
| 6,076,718 A | 6/2000 | Naohiko et al. | |
| 6,197,136 B1 * | 3/2001 | Hishinuma | B29C 66/91221 |
| | | | 156/228 |
| 6,209,286 B1 | 4/2001 | Perkins et al. | |
| 6,301,859 B1 | 10/2001 | Nakamura | |
| 6,410,119 B1 | 6/2002 | De Luca et al. | |
| 6,423,166 B1 | 7/2002 | Simhaee | |
| 6,550,229 B2 | 4/2003 | Sperry et al. | |
| 6,565,946 B2 | 5/2003 | Perkins et al. | |
| 6,598,373 B2 | 7/2003 | Sperry et al. | |
| 6,605,169 B2 | 8/2003 | Perkins et al. | |
| 6,635,145 B2 | 10/2003 | Cooper | |
| 6,651,406 B2 | 11/2003 | Sperry et al. | |
| 6,656,310 B2 | 12/2003 | Basque | |
| 6,659,150 B1 | 12/2003 | Perkins et al. | |
| 6,696,135 B2 | 2/2004 | Simhaee | |
| 6,712,357 B1 * | 3/2004 | Tranquilla | B65H 5/062 |
| | | | 271/258.01 |
| 6,786,022 B2 | 9/2004 | Fuss et al. | |
| 6,804,933 B2 | 10/2004 | Sperry et al. | |
| 6,932,134 B2 | 8/2005 | Selle et al. | |
| 6,952,959 B2 * | 10/2005 | Hishinuma | G01N 19/04 |
| | | | 73/159 |
| 6,984,412 B2 | 1/2006 | Tanaka | |
| 7,040,073 B2 | 5/2006 | Perkins et al. | |
| 7,059,097 B2 | 6/2006 | Perkins et al. | |
| 7,067,025 B2 | 6/2006 | Borgeat | |
| 7,090,912 B2 | 8/2006 | Perkins et al. | |
| 7,165,375 B2 | 1/2007 | O'Dowd | |
| 7,220,476 B2 | 5/2007 | Sperry et al. | |
| 7,223,462 B2 | 5/2007 | Perkins et al. | |
| 7,225,599 B2 | 6/2007 | Sperry et al. | |
| 7,247,219 B2 | 7/2007 | O'Dowd | |
| 7,328,541 B2 | 2/2008 | Garceau et al. | |
| 7,361,397 B2 | 4/2008 | Perkins et al. | |
| RE40,288 E | 5/2008 | Perkins et al. | |
| 7,389,626 B2 | 6/2008 | Sperry et al. | |
| 7,429,304 B2 | 9/2008 | McNamara, Jr. et al. | |
| 7,441,772 B2 | 10/2008 | Kawashima et al. | |
| 7,536,837 B2 | 5/2009 | Perkins et al. | |
| 7,721,781 B2 | 5/2010 | Sperry et al. | |
| 7,832,562 B2 | 11/2010 | Perkins et al. | |
| RE42,240 E | 3/2011 | De Luca et al. | |
| 7,950,433 B2 * | 5/2011 | Sperry | B31D 5/0073 |
| | | | 156/361 |
| 8,100,308 B2 | 1/2012 | Aquarius | |
| 8,128,770 B2 * | 3/2012 | Wetsch | B29C 66/91421 |
| | | | 156/147 |
| 8,201,690 B1 | 6/2012 | Gess | |
| 8,215,487 B1 | 7/2012 | Gess | |
| 8,256,189 B2 * | 9/2012 | Montano | B29C 65/7451 |
| | | | 53/373.7 |
| 8,323,774 B2 | 12/2012 | Perkins et al. | |
| 8,388,508 B2 * | 3/2013 | Wetsch | B31D 5/04 |
| | | | 493/464 |
| 8,402,719 B2 | 3/2013 | Birkle et al. | |
| 8,454,779 B2 | 6/2013 | Wetsch et al. | |
| 8,567,159 B2 | 10/2013 | Sperry et al. | |
| 8,696,848 B2 | 4/2014 | Wetsch et al. | |
| 8,726,965 B2 * | 5/2014 | Marquardt | B29D 99/0014 |
| | | | 156/581 |
| 8,776,483 B2 | 7/2014 | Fuss et al. | |
| 8,869,859 B2 * | 10/2014 | Knaak | B29C 44/182 |
| | | | 156/383 |
| 9,003,743 B2 | 4/2015 | Perkins et al. | |
| 9,027,314 B2 | 5/2015 | Zeiler et al. | |
| 9,028,935 B2 | 5/2015 | Zeiler et al. | |
| 9,333,722 B2 | 5/2016 | Aquarius | |
| 9,527,647 B2 | 12/2016 | Knaak et al. | |
| 9,540,199 B2 * | 1/2017 | Wang | G07F 19/202 |
| 9,844,911 B2 * | 12/2017 | Corbin | B29C 65/7802 |
| 10,131,094 B2 * | 11/2018 | Shook | B29C 65/7873 |
| 10,150,272 B2 * | 12/2018 | Chiang | B31D 5/0073 |
| 10,286,617 B2 * | 5/2019 | Murch | B31D 5/0073 |
| 10,703,049 B2 * | 7/2020 | Wadsworth | B29C 66/524 |
| 2002/0112808 A1 | 8/2002 | Perkins et al. | |
| 2003/0118778 A1 | 6/2003 | Perkins et al. | |
| 2004/0134164 A1 | 7/2004 | Perkins et al. | |
| 2005/0127600 A1 * | 6/2005 | Wood | B65H 20/02 |
| | | | 271/273 |
| 2005/0235600 A1 | 10/2005 | Perkins et al. | |
| 2005/0236295 A1 | 10/2005 | Perkins et al. | |
| 2005/0244613 A9 | 11/2005 | Perkins et al. | |
| 2006/0110581 A1 | 5/2006 | Perkins et al. | |
| 2006/0218876 A1 | 10/2006 | Perkins et al. | |
| 2006/0257601 A1 | 11/2006 | Perkins et al. | |
| 2007/0034329 A1 * | 2/2007 | Padoy | B29C 66/232 |
| | | | 156/274.4 |
| 2007/0084566 A1 * | 4/2007 | Seki | B29C 66/91212 |
| | | | 156/583.1 |
| 2008/0014389 A1 | 1/2008 | Wehrmann | |
| 2008/0022630 A1 | 1/2008 | Fuss et al. | |
| 2008/0066852 A1 * | 3/2008 | Wetsch | B29C 65/18 |
| | | | 156/147 |
| 2008/0141620 A1 | 6/2008 | Szabo | |
| 2009/0021762 A1 | 1/2009 | Saito | |
| 2009/0127323 A1 | 5/2009 | Zeiler et al. | |
| 2009/0166346 A1 * | 7/2009 | Ketelhut | B29C 66/81471 |
| | | | 219/148 |
| 2010/0068430 A1 | 3/2010 | Perkins et al. | |
| 2011/0053749 A1 * | 3/2011 | Wetsch | B65H 1/10 |
| | | | 493/464 |
| 2011/0293864 A1 | 12/2011 | Perkins et al. | |
| 2012/0080418 A1 | 4/2012 | Sakamoto et al. | |
| 2013/0118690 A1 * | 5/2013 | Orsini | B29C 66/816 |
| | | | 156/378 |

(56) References Cited

U.S. PATENT DOCUMENTS

| | | | |
|---|---|---|---|
| 2013/0303353 A1* | 11/2013 | Orsini, III | B29C 65/7873 |
| | | | 493/189 |
| 2014/0130461 A1 | 5/2014 | Johan | |
| 2014/0260094 A1 | 9/2014 | Wehrmann | |
| 2015/0151864 A1* | 6/2015 | Lin | B31D 5/0073 |
| | | | 53/79 |
| 2015/0239196 A1* | 8/2015 | Wetsch | B65B 43/06 |
| | | | 53/79 |
| 2016/0055700 A1* | 2/2016 | Wang | B65H 20/02 |
| | | | 271/314 |
| 2017/0029146 A1 | 2/2017 | Palumbo et al. | |
| 2017/0259522 A1* | 9/2017 | Cheich | A63J 5/021 |
| 2017/0275036 A1 | 9/2017 | Wetsch et al. | |
| 2017/0282479 A1* | 10/2017 | Wetsch | B29C 66/81465 |
| 2017/0305585 A1 | 10/2017 | Rizzi et al. | |
| 2017/0305586 A1 | 10/2017 | Rizzi et al. | |
| 2018/0009178 A1* | 1/2018 | Shook | B29C 65/7894 |
| 2019/0240921 A1* | 8/2019 | Si | B29C 65/02 |
| 2020/0172272 A1* | 6/2020 | Cittadino | B65B 57/02 |
| 2021/0008814 A1* | 1/2021 | Hishinuma | B29C 66/8242 |

OTHER PUBLICATIONS

European Patent Office; extended search report dated Jun. 29, 2020, and cited in EP Patent Application No. 19190121.4, originally completed Jan. 15, 2020; 9 pages.

* cited by examiner

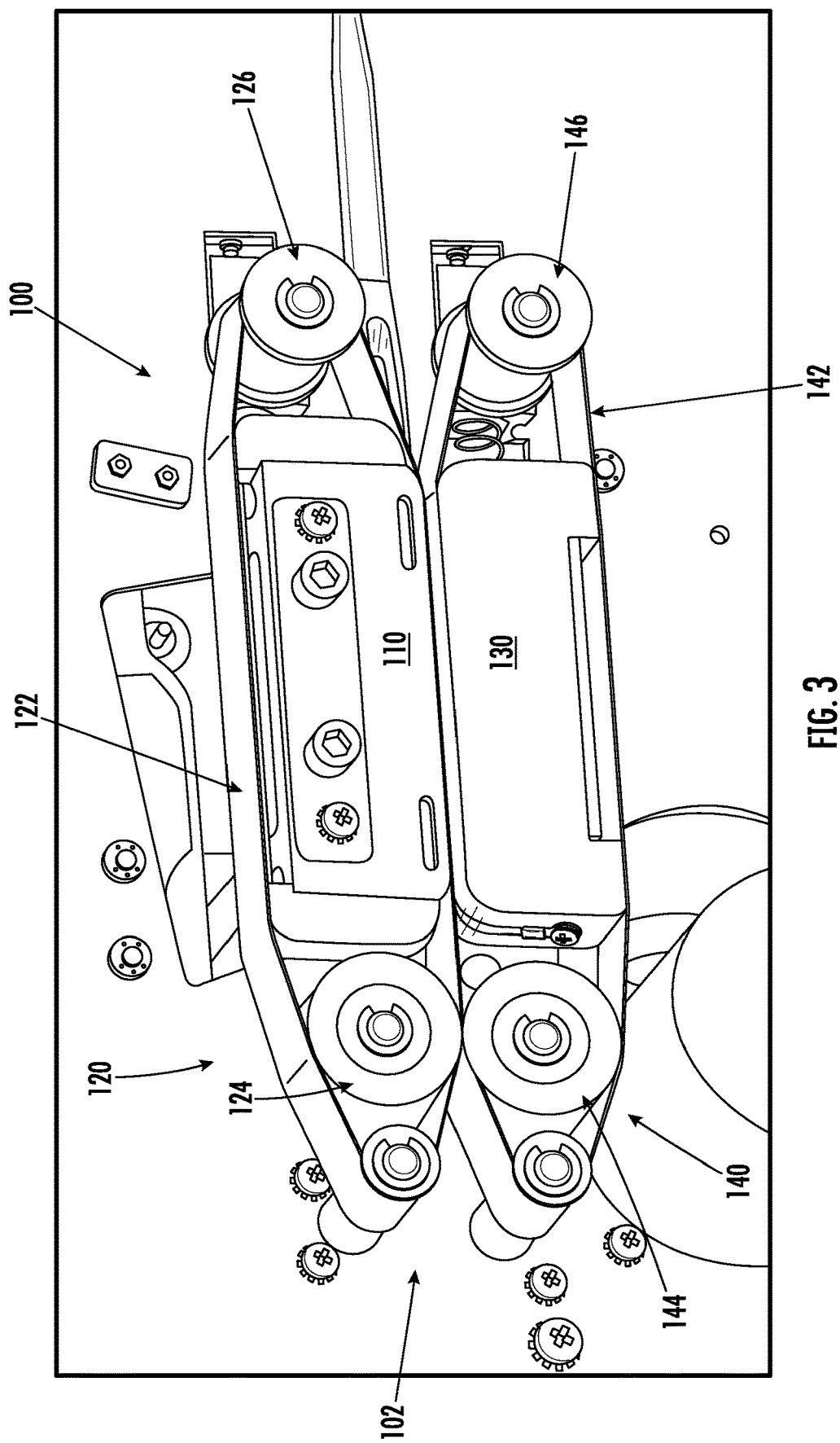

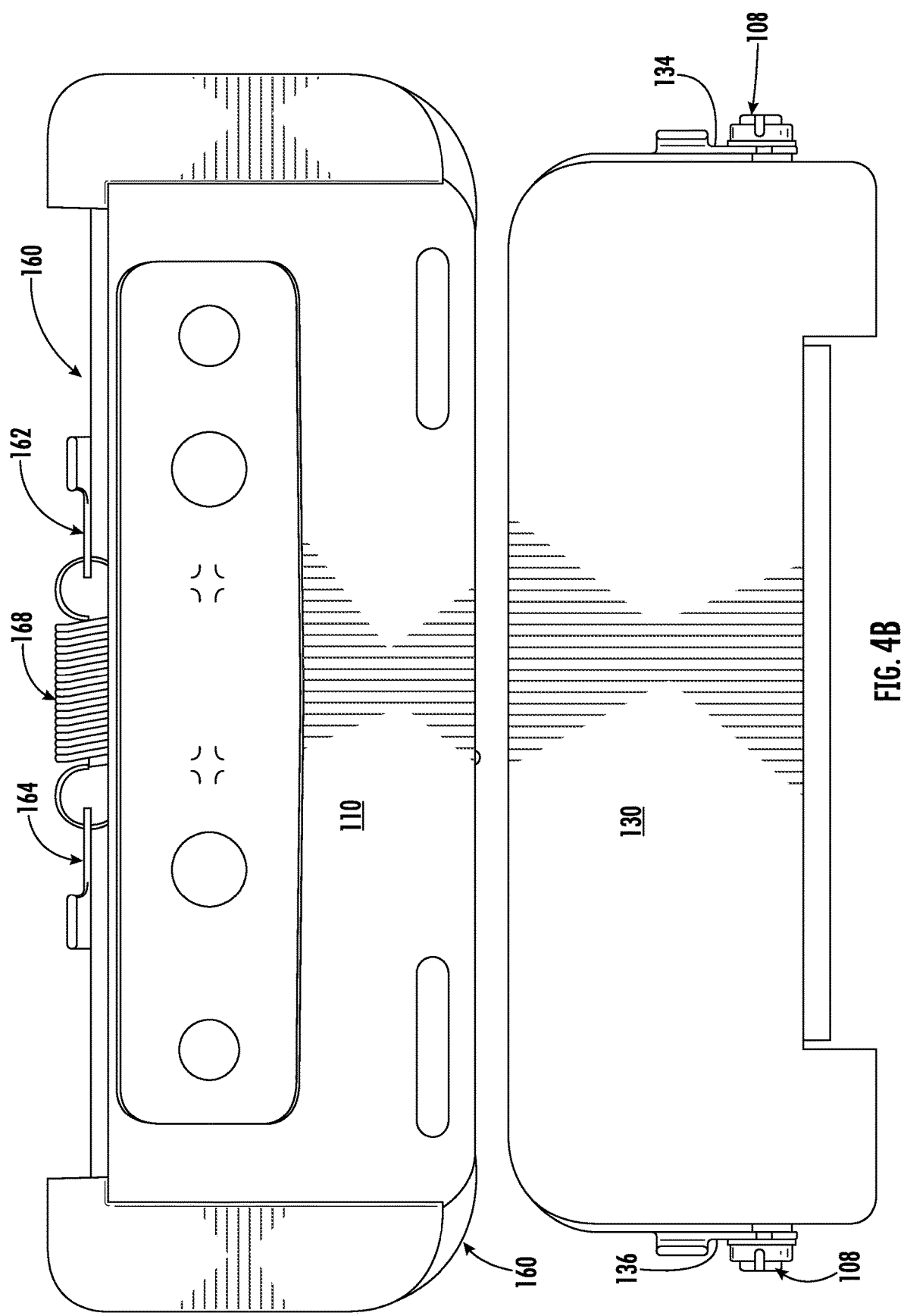

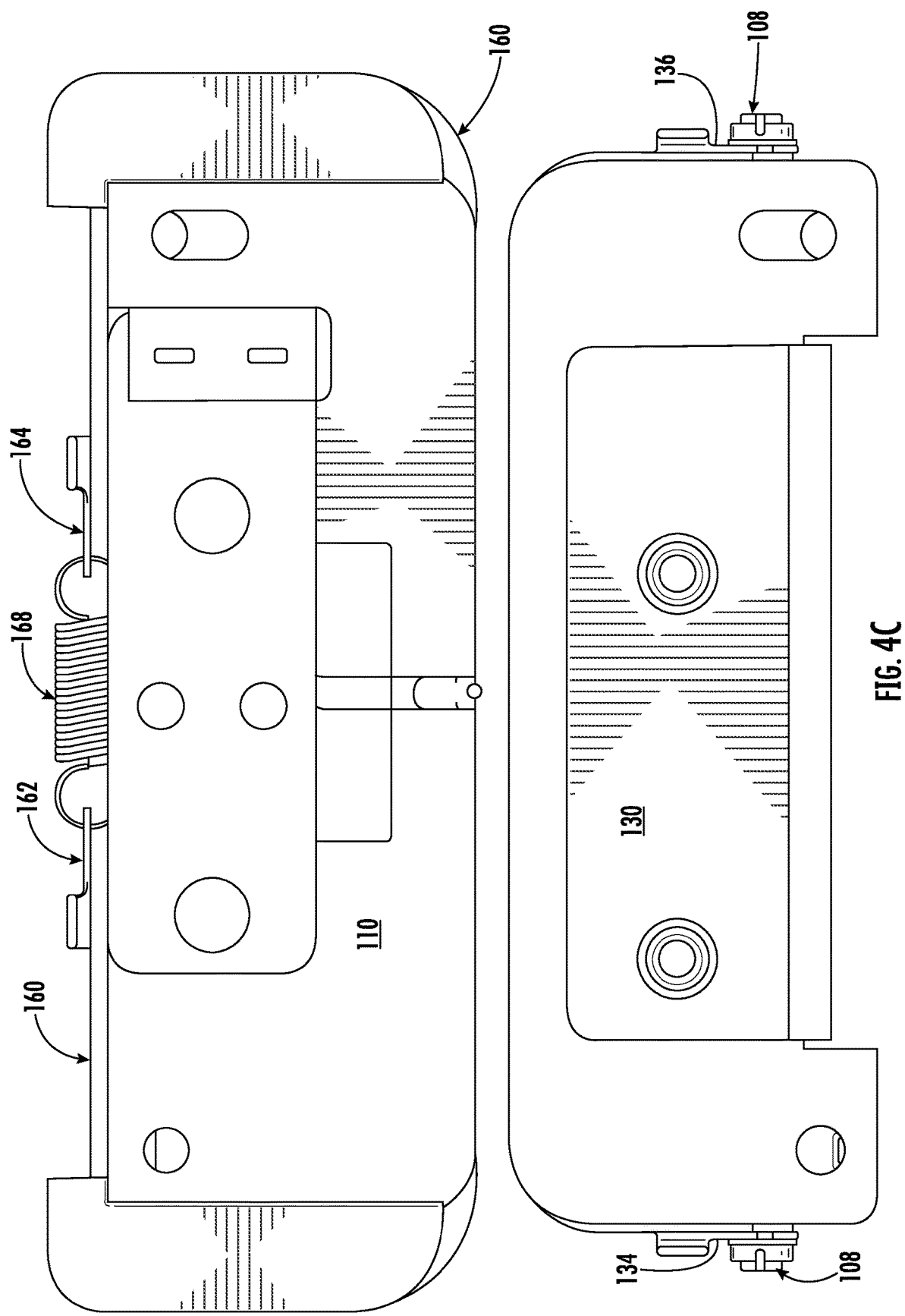

PACKAGING APPARATUS FOR FILM INFLATION AND METHOD THEREOF

CROSS REFERENCE AND PRIORITY CLAIM UNDER 35 U.S.C. § 119

The present Application for a Patent claims priority to U.S. Provisional Patent Application Ser. No. 62/714,853 entitled "AIR PILLOW MACHINE" filed on Aug. 6, 2018 and assigned to the assignees hereof and hereby expressly incorporated by reference herein.

FIELD

This application relates generally to the field of packaging apparatuses, and more particularly to a sealing apparatus with a sensor and a pinch roller apparatus for improved feeding and sealing of film material during operation of a packaging apparatus.

BACKGROUND

Packaging apparatuses utilize varying speeds and fluid inflation rates to fill chambers of film material (e.g., air pillows, bubble wrap, or the like) with the desired amount of fluid (e.g., air, gas, or the like) based on the film material and the application in which the inflated article (e.g., inflated film material) will be utilized. In order to fill the chambers for the desired application, proper filling and sealing of the chambers is required.

BRIEF SUMMARY

The present disclosure provides apparatuses, systems, methods, and computer program products for packaging apparatuses and the use thereof. The packaging apparatus of the present disclosure comprises components that improve the delivery of the film material, filling of the film material with fluid (e.g., air, gas, or the like), and sealing of the inflated film material to create the inflated article. As such, a pinch roller apparatus (e.g., comprising one or more guide and/or pinch rollers) is used to deliver film material to a fluid supply apparatus (e.g., nozzle and blower apparatus, or the like) that fills one or more chambers of the film material with fluid (e.g., air, gas, or other like fluid), and the film material is then sealed by a sealing apparatus (e.g., using one or more heating elements with an improved temperature sensor configuration) that seals the fluid within the one or more chambers in order to form the inflated article (e.g., inflated packaging material). In particular, the sealing apparatus provides an improved apparatus for sealing the one or more inflated chambers of the film material by improving the accuracy of the temperature reading in the heating zone, and thus, providing improved control of the one or more heating elements within the sealing apparatus used for sealing the film material. Furthermore, the pinch roll apparatus improves the delivery of the film material to the fluid supply apparatus and the sealing apparatus by pinching at least a portion of the film material to resist the backflow of fluid to the film supply, and orienting the film material to improve the delivery of the film material to the sealing apparatus by reducing or removing the bunching (e.g., folds, wrinkles, or the like) in the film material.

The sealing apparatus of the present disclosure utilizes an improved sensor configuration (e.g., thermocouple configuration, or the like) in which a sensor is operatively coupled (e.g., spot welded, or the like) between a protective member (e.g., a thermally conductive metal shim, or the like) and a heating element (e.g., a resistive heater wire, or the like), as will be discussed in further detail herein. Typical sealing apparatuses have a problem capturing consistent temperature readings in order to accurately estimate the temperature in the sealing zone (e.g., heat sealing zone) in which the film material is sealed. The present invention locates one or more sensors in an improved location in order to more accurately determine temperature readings within the sealing zone, and furthermore, covers the one or more sensors using a protective member in order to minimize damaging the one or more sensors.

Additionally, the pinch roller apparatus (e.g., the two rollers, such as a guide roller, a pinch roller, or the like) compresses the film material and positions the film material (e.g., changes the plane of the film material) as it passes through the rollers to restrict bunching (e.g., folds, wrinkles, or the like) of the film material. This compression of the film material restricts (e.g., stops, impedes, or the like) the fluid from flowing along the one or more fill channels of the film material into the film supply (e.g., film roll, or the like), which could cause the film to move around and not feed onto the fluid supply apparatus properly. The pinch roller apparatus also creates a section of the film material between the fluid supply apparatus (e.g., fill nozzle, or the like) and/or the sealing apparatus, and the pinch roller apparatus, in order to seal off the fill channels of the film material to provide improved fluid inflation of the one or more chambers of the film material. The section of the film material created for inflation provides the fluid supply apparatus the ability to generate pressure to expand the one or more chambers of the film material with the fluid. Furthermore, the geometry and orientation of the pinch roller apparatus, and the rollers thereof (e.g., the pinch roller, the guide rollers, or the like), within the packaging apparatus stretches the film material out to provide for even expansion of the one or more chambers as they expand with fluid. For example, the out of plane orientation of the of the one or more rollers (e.g., the guide roller, the pinch roller) that changes the orientation of the film material and/or the curved and/or angled portions of the surfaces of the one more rollers allows for even tension of the film material, which may reduce bunching (e.g., wrinkles, folds, or the like) that can occur within the film material.

In some embodiments, a packaging apparatus is provided, which comprises a sealing apparatus or a pinch roll apparatus. The sealing apparatus comprises a support member; a heating element operatively coupled to the support member; a protective member operatively coupled to the heating element; and a sensor operatively coupled to the heating element or the protective member, such that the sensor is configured to determine a temperature for sealing a film material. Moreover, the pinch roll apparatus comprises a first roller; and a second roller operatively coupled to the first roller such that the first roller is adjustable with respect to the second roller to guide the film material while the film material is inflated by a nozzle apparatus.

In some embodiments, or in combination with any of the above embodiments, the packaging apparatus comprises the sealing apparatus and the pinch roll apparatus.

In some embodiments, or in combination with any of the above embodiments, the sensor is operatively coupled between the heating element and the protective member, and the protective member interacts with the film material to seal the film material.

In some embodiments, or in combination with any of the above embodiments, the packaging apparatus further comprises a film supply member with a supply longitudinal axis, such that the film supply member is confirmed to support a spool of film material that rotates around the longitudinal axis of the film supply. Here, the first roller or the second roller each have a roller longitudinal axis, wherein the roller longitudinal axis is angled with respect to the supply longitudinal axis. Moreover, the first roller is moveable with respect to the second roller. Also, the first roller or the second roller comprises a diverging portion in which a surface diverges from a first cross-sectional area to a second cross-sectional area that is smaller than the first cross-sectional area.

In some embodiments, or in combination with any of the above embodiments, a sealing apparatus is provided, which comprises a support member; a heating element operatively coupled to the support member; a protective member operatively coupled to the heating element; and a sensor operatively coupled to the heating element or the protective member; such that the sensor is configured to determine a temperature for sealing one or more chambers of a film material.

In some embodiments, or in combination with any of the above embodiments, the sensor is a temperature sensor.

In some embodiments, or in combination with any of the above embodiments, the temperature sensor is a thermocouple.

In some embodiments, or in combination with any of the above embodiments, the sensor is operatively coupled between the heating element and the protective member, and the protective member interacts with the film material to seal the film material.

In some embodiments, or in combination with any of the above embodiments, the protective member is a shim.

In some embodiments, or in combination with any of the above embodiments, the protective member is operatively coupled to the support member using an adjustment element.

In some embodiments, or in combination with any of the above embodiments, the protective member expands and contracts as a temperature of the heating element increases and decreases. The adjustment element adjusts the protective member due to the heating and cooling of the protective member element.

In some embodiments, or in combination with any of the above embodiments, the adjustment element is a spring.

In some embodiments, or in combination with any of the above embodiments, the support member comprises a first support member and the heating element is a first heating element. Here, the packaging apparatus further comprises a second support member, wherein the second support member comprises a second heating element, such that the film material passes between the protective member and the second heating element to seal the one or more chambers of the film material.

In some embodiments, or in combination with any of the above embodiments, the packaging apparatus further comprises a film feeding component. The film feeding component comprises a first belt, a second belt, and one or more drive mechanisms, wherein the one or more drive mechanisms drive the first belt or the second belt to move the film material through the sealing component.

In some embodiments, or in combination with any of the above embodiments, a pinch roller apparatus is provided, which comprises a first roller; and a second roller operatively coupled to the first roller. The first roller is adjustable with respect to the second roller to guide the film while the film is inflated by a nozzle apparatus, In some embodiments, or in combination with any of the above embodiments, the first roller comprises a pinch roller, and the second roller comprises a guide roller.

In some embodiments, or in combination with any of the above embodiments, the first roller and the second roller are pinch rollers that are both adjustable with respect to each other.

In some embodiments, or in combination with any of the above embodiments, a film supply member a supply longitudinal axis, wherein the film supply member is confirmed to support a spool of film material that rotates around the longitudinal axis of the film supply. The first roller or the second roller each have a roller longitudinal axis, and the roller longitudinal axis is angled with respect to the supply longitudinal axis.

In some embodiments, or in combination with any of the above embodiments, the first roller or the second roller comprises a diverging portion in which a surface diverges from a first cross-sectional area to a second cross-sectional area that is smaller than the first cross-sectional area.

In some embodiments, or in combination with any of the above embodiments, a method of operating a package apparatus is provided. The method comprises the steps of identifying a temperature of a protective member of a sealing apparatus using a sensor; inflating one or more chambers of a film material with a fluid using a nozzle when the temperatures meets a desired temperature; and feeding the film material through the sealing apparatus; sealing the one or more chambers of the film material using the sealing apparatus. Here, the sealing apparatus comprises a support member; a heating element operatively coupled to the support member; the protective member operatively coupled to the heating element; and the sensor operatively coupled to the heating element or the protective member; such that the sensor is configured to determine a temperature for sealing a film material. Feeding the film material through the sealing apparatus is optionally perform using a pinch roll apparatus. The pinch roll apparatus comprises a first roller; and a second roller operatively coupled to the first roller; such that the first roller is adjustable with respect to the second roller to guide the film material while the film material is inflated by the nozzle apparatus To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF DRAWINGS

Having thus described embodiments of the invention in general terms, reference will now be made to the accompanying drawings.

Figure 1:
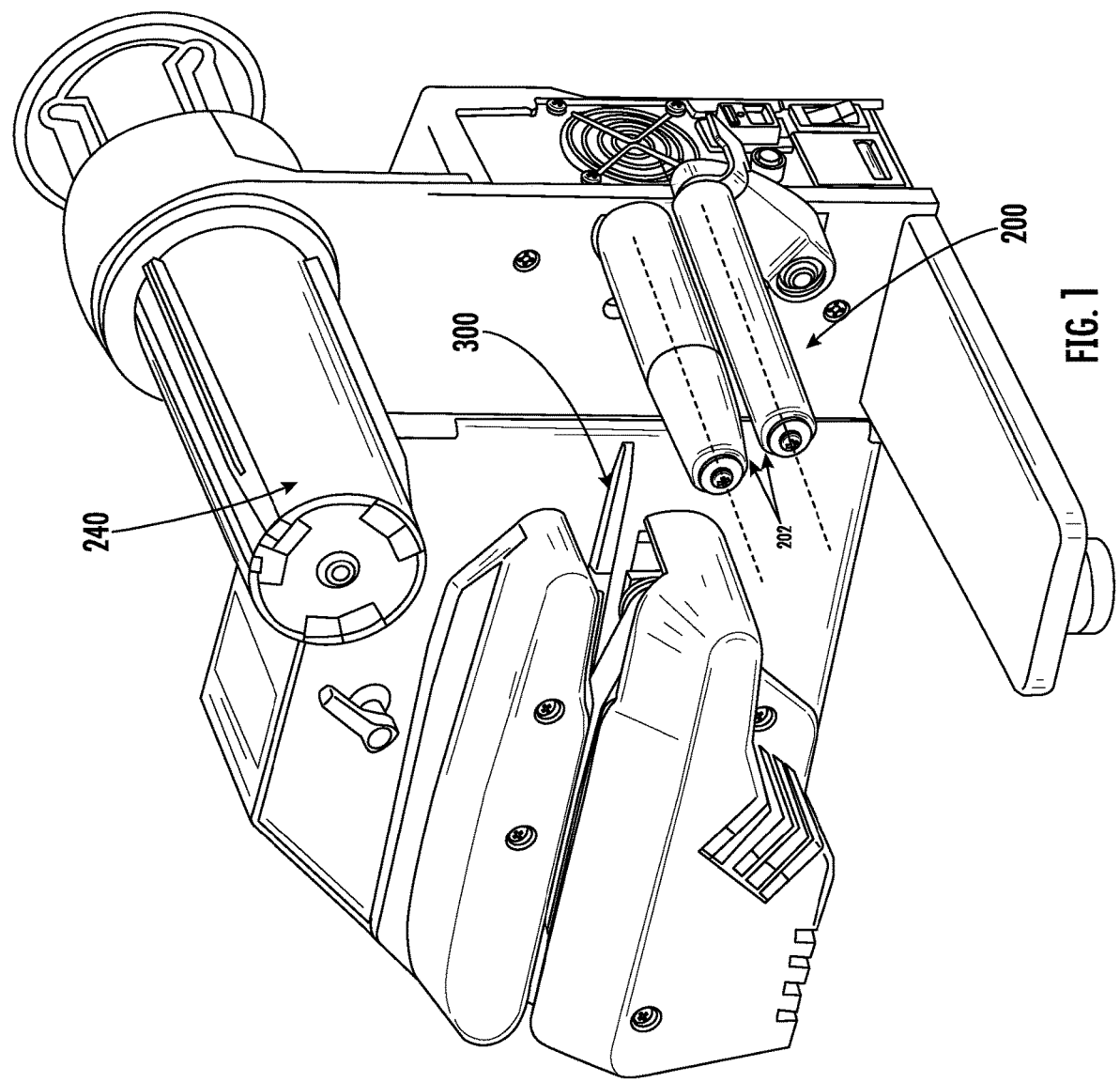

FIG. 1 illustrates a perspective view of the package apparatus, in accordance with some embodiments of the present disclosure.

Figure 2:
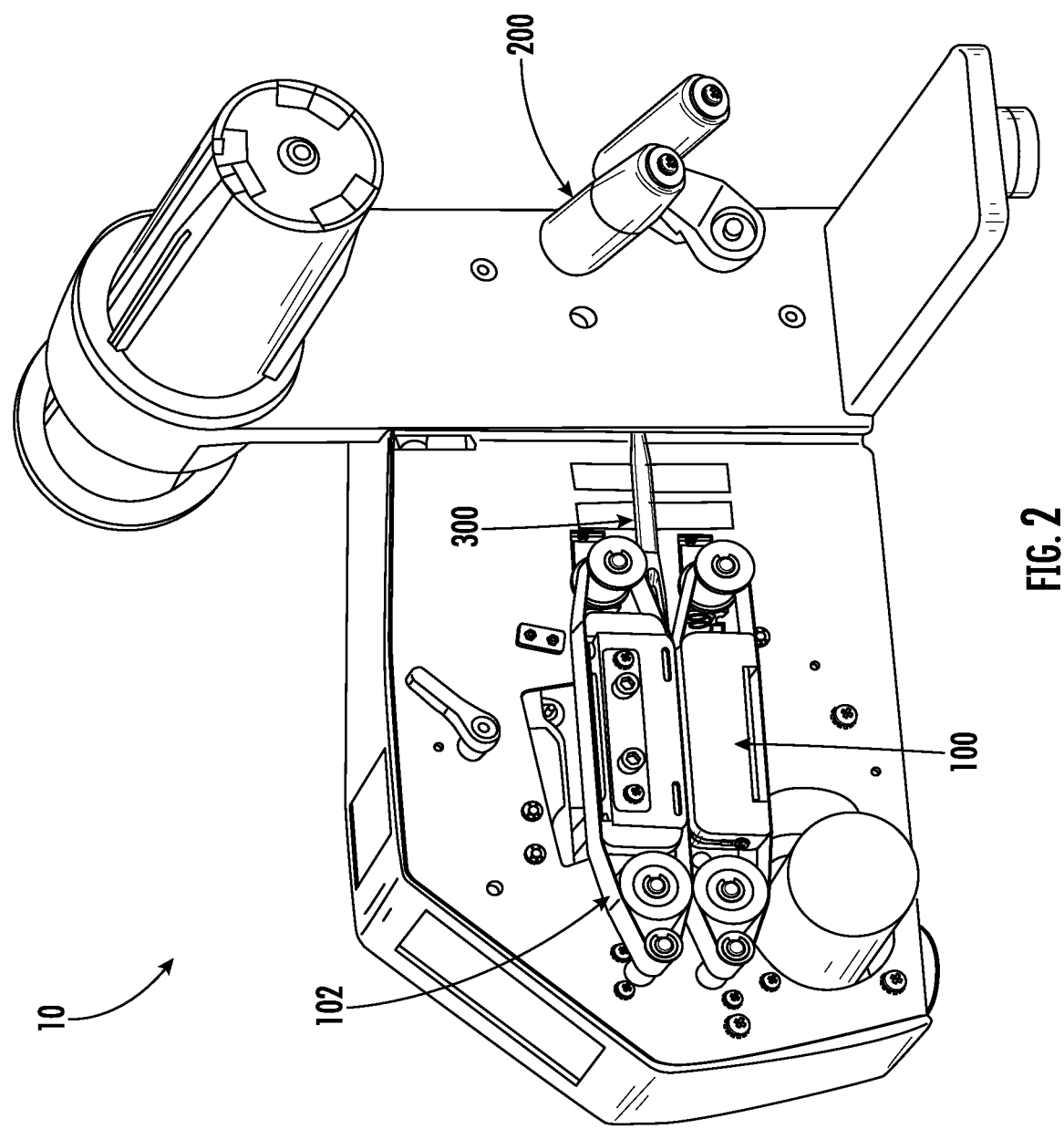

FIG. 2 illustrates a perspective view of the package apparatus with the sealing apparatus covers removed, in accordance with some embodiments of the present disclosure.

FIG. 3 illustrates a perspective view of the sealing apparatus, in accordance with some embodiments of the present disclosure.

Figure 4A:
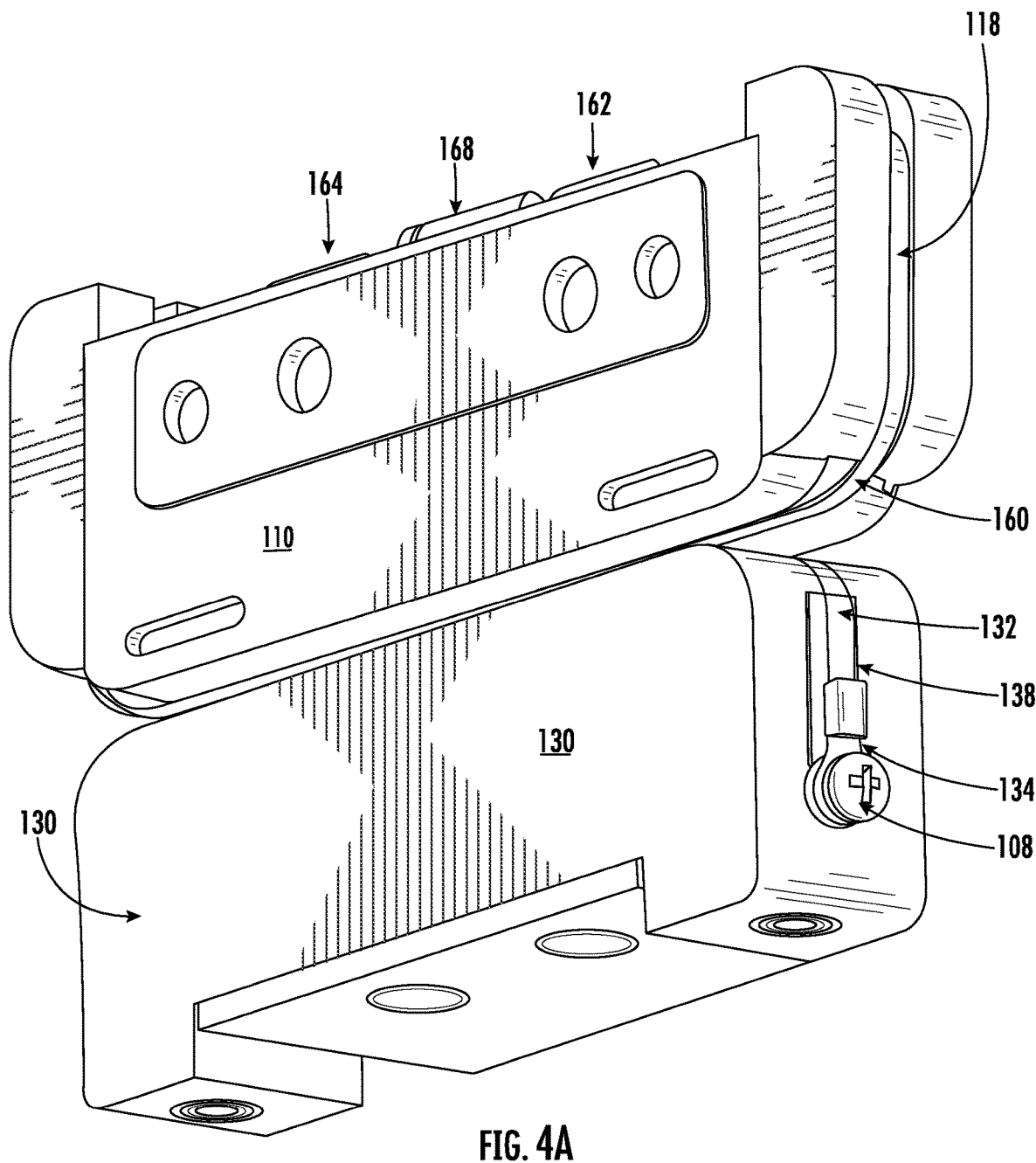

FIG. 4A illustrates a perspective view of a portion of the sealing apparatus, in accordance with some embodiments of the present disclosure.

FIG. 4B illustrates a front view of a portion of the sealing apparatus, in accordance with some embodiments of the present disclosure.

FIG. 4C illustrates a rear view of a portion of the sealing apparatus, in accordance with some embodiments of the present disclosure.

Figure 4E:
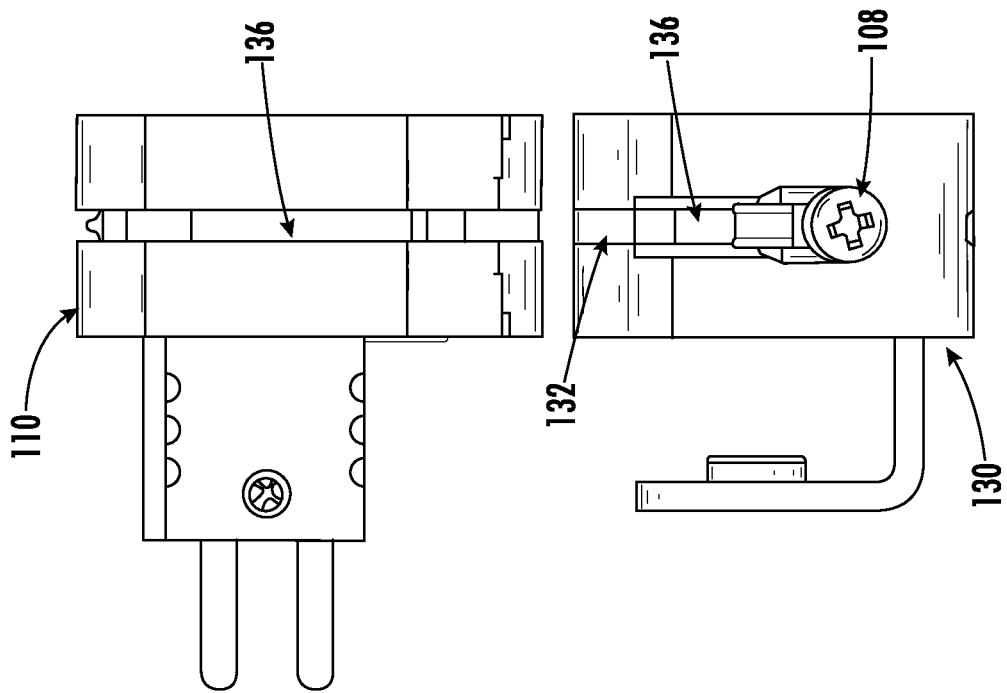
Figure 4D:
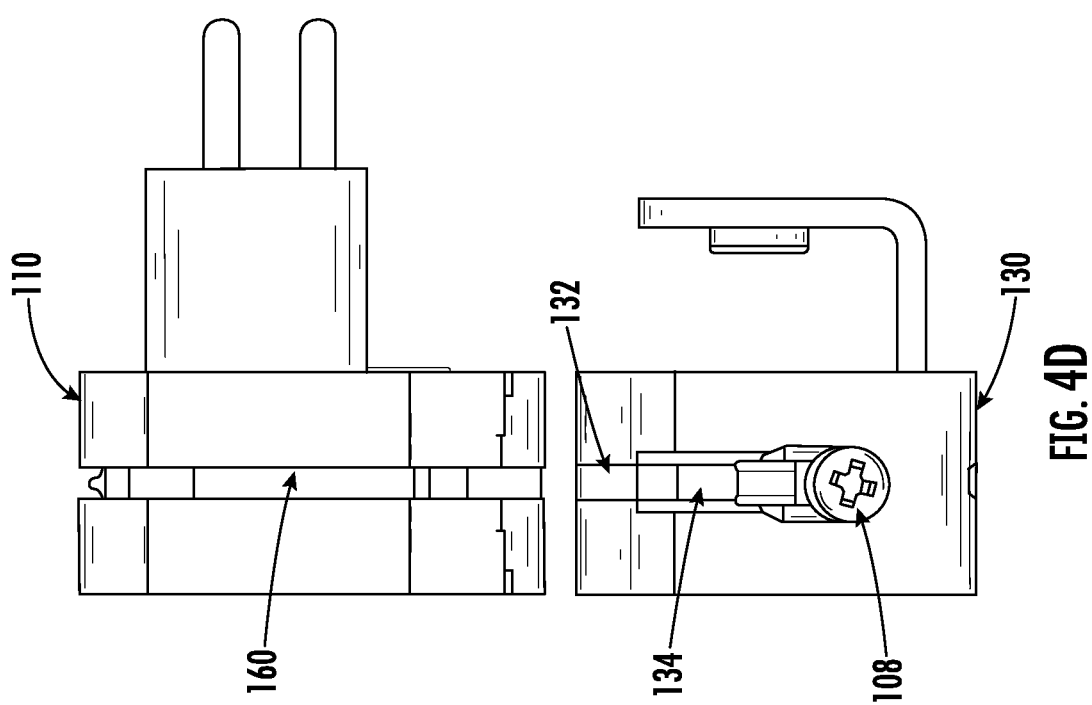

FIG. 4D illustrates an inlet side view of a portion of the sealing apparatus, in accordance with some embodiments of the present disclosure.

FIG. 4E illustrates an outlet side view of a portion of the sealing apparatus, in accordance with some embodiments of the present disclosure.

Figure 5A:
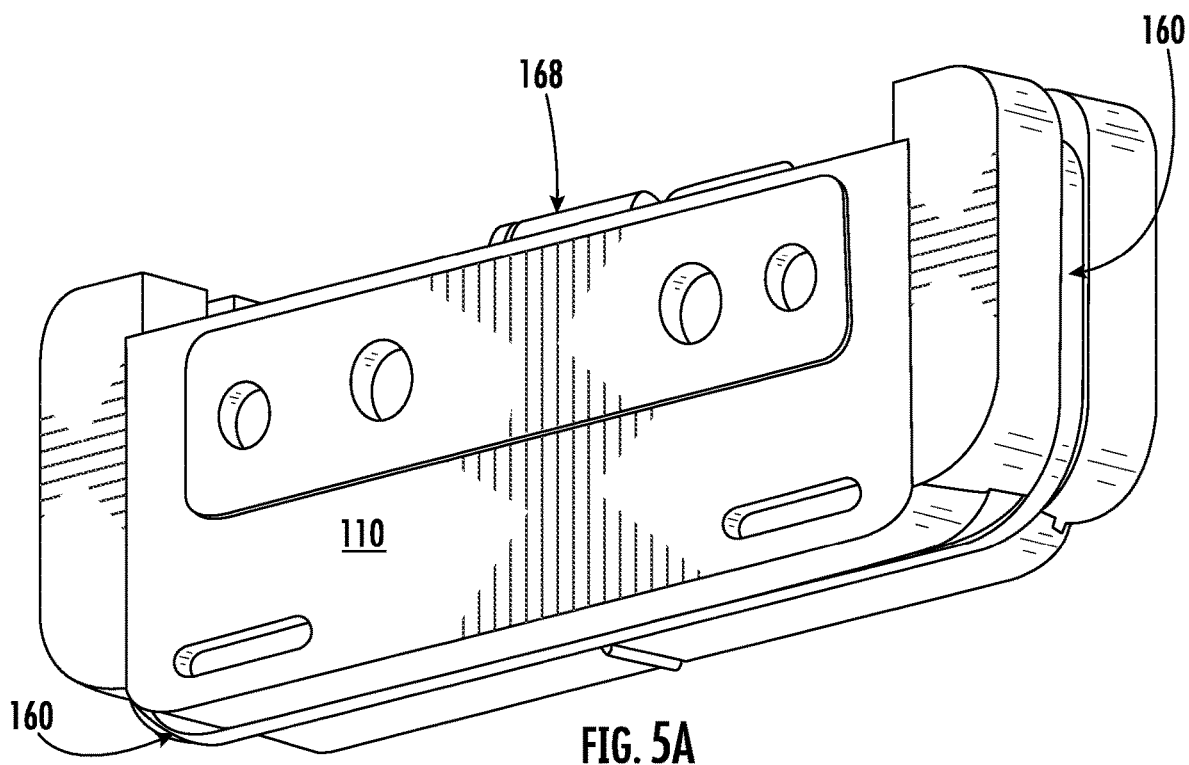

FIG. 5A illustrates a front perspective view of a first sealing block of the sealing apparatus with the protective member installed, in accordance with some embodiments of the present disclosure.

Figure 5B:
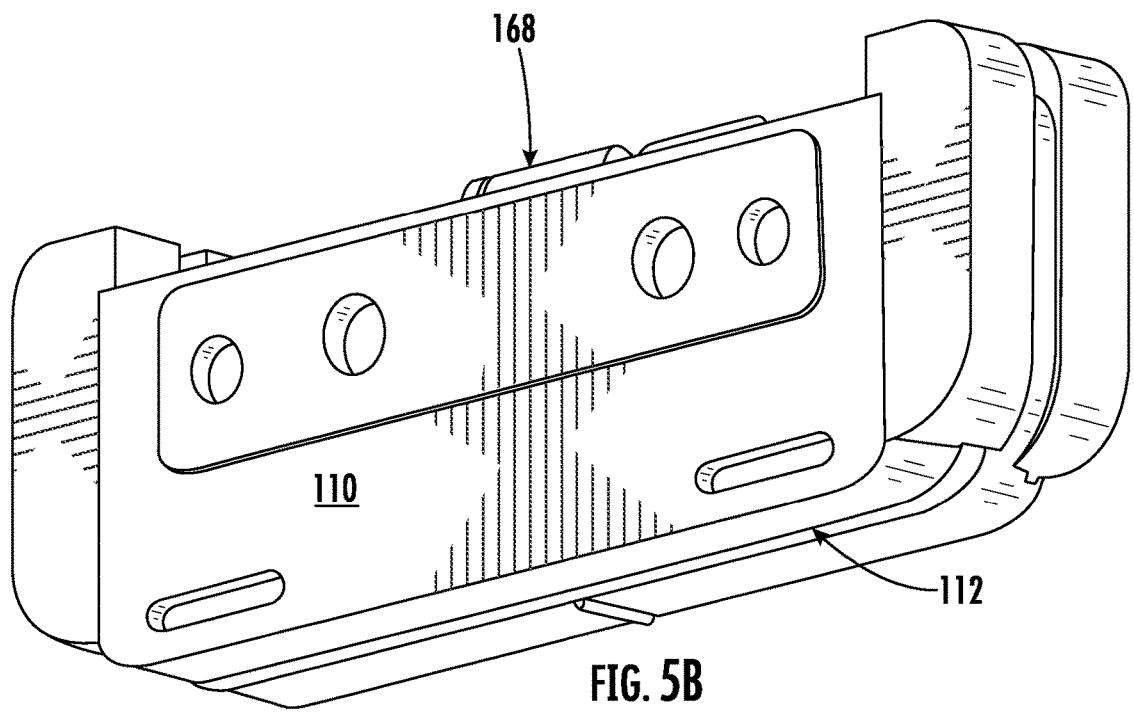

FIG. 5B illustrates a front perspective view of a first sealing block of the sealing apparatus with the protective member removed, in accordance with some embodiments of the present disclosure.

Figure 5C:
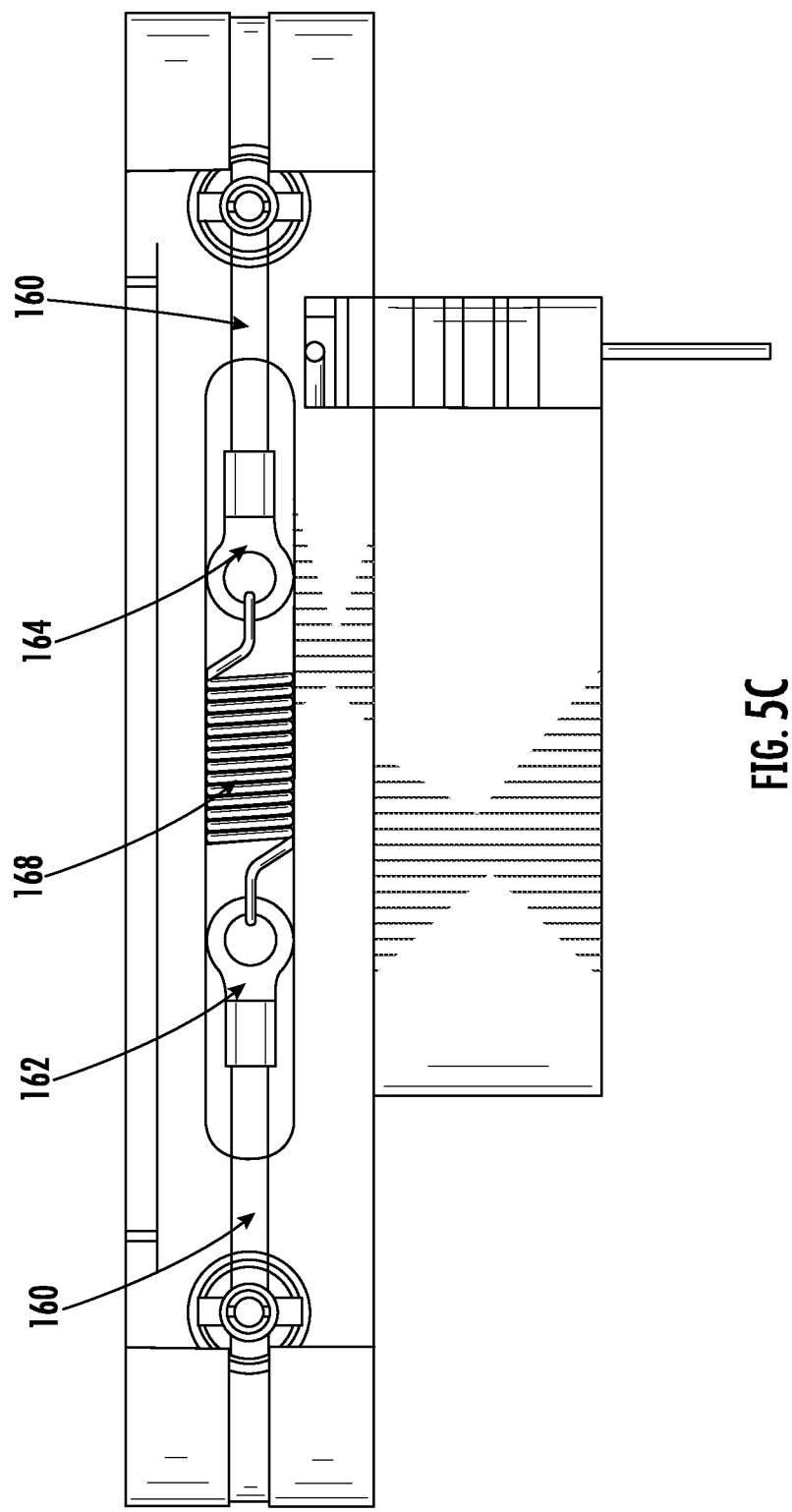

FIG. 5C illustrates a top view of a first sealing block of the sealing apparatus with the protective member installed, in accordance with some embodiments of the present disclosure.

Figure 5D:
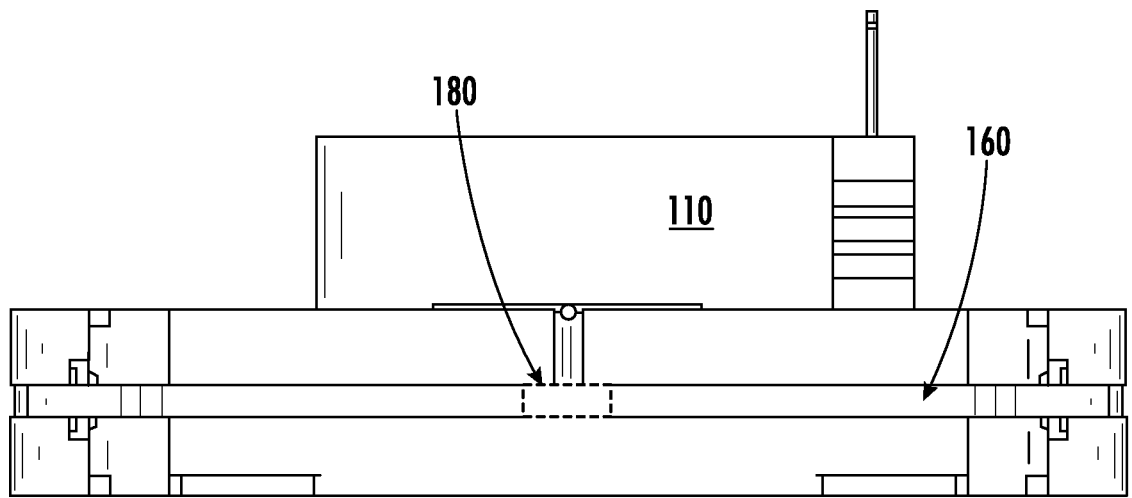

FIG. 5D illustrates a bottom view of a first sealing block of the sealing apparatus with the protective member and sensor installed, in accordance with some embodiments of the present disclosure.

Figure 5E:
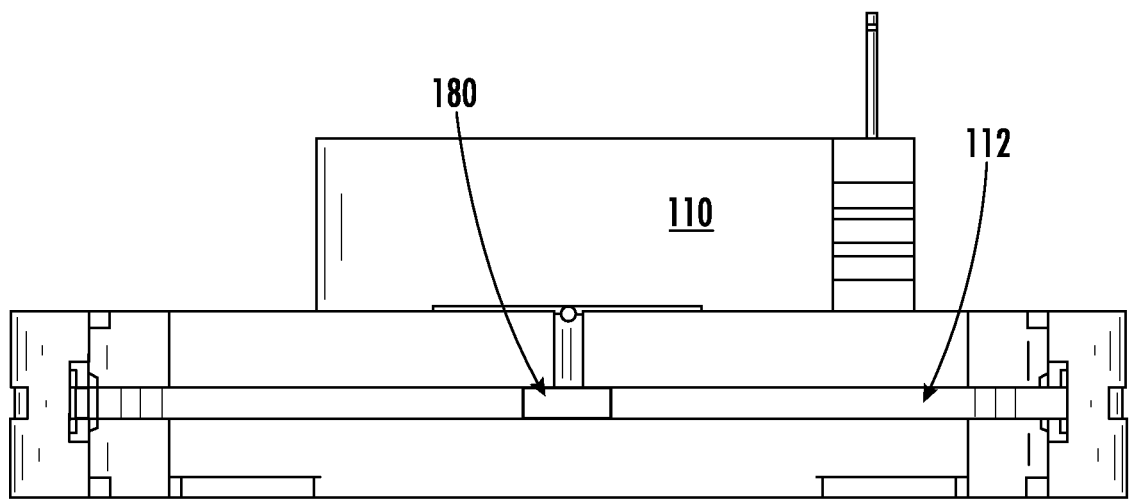

FIG. 5E illustrates a bottom view of a first sealing block of the sealing apparatus with the protective member removed, in accordance with some embodiments of the present disclosure.

Figure 5F:
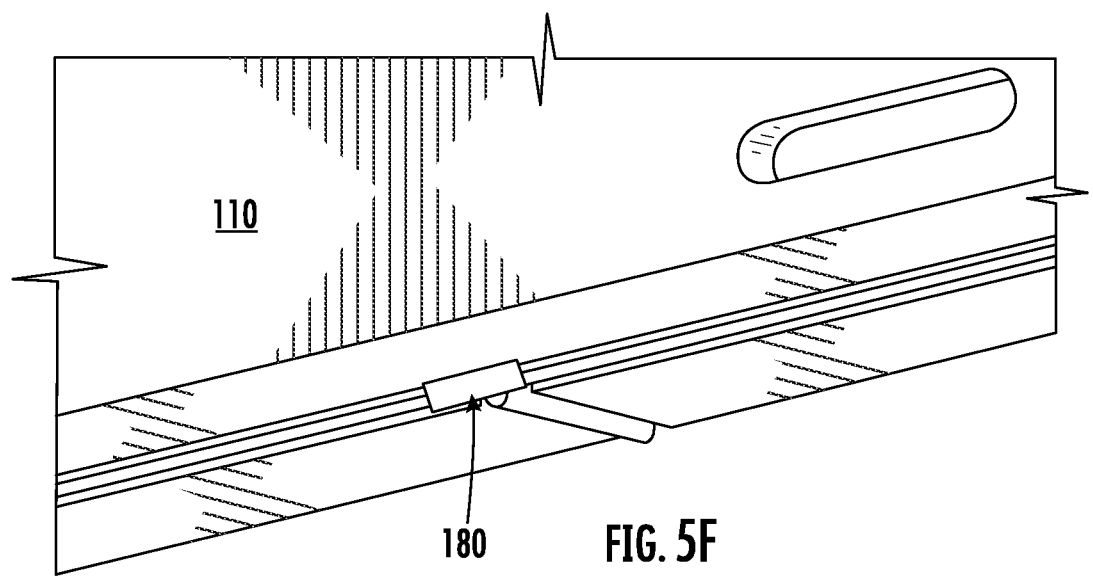

FIG. 5F illustrates a perspective view of a first sealing block of the sealing apparatus with the protective member removed, in accordance with some embodiments of the present disclosure.

Figure 5G:
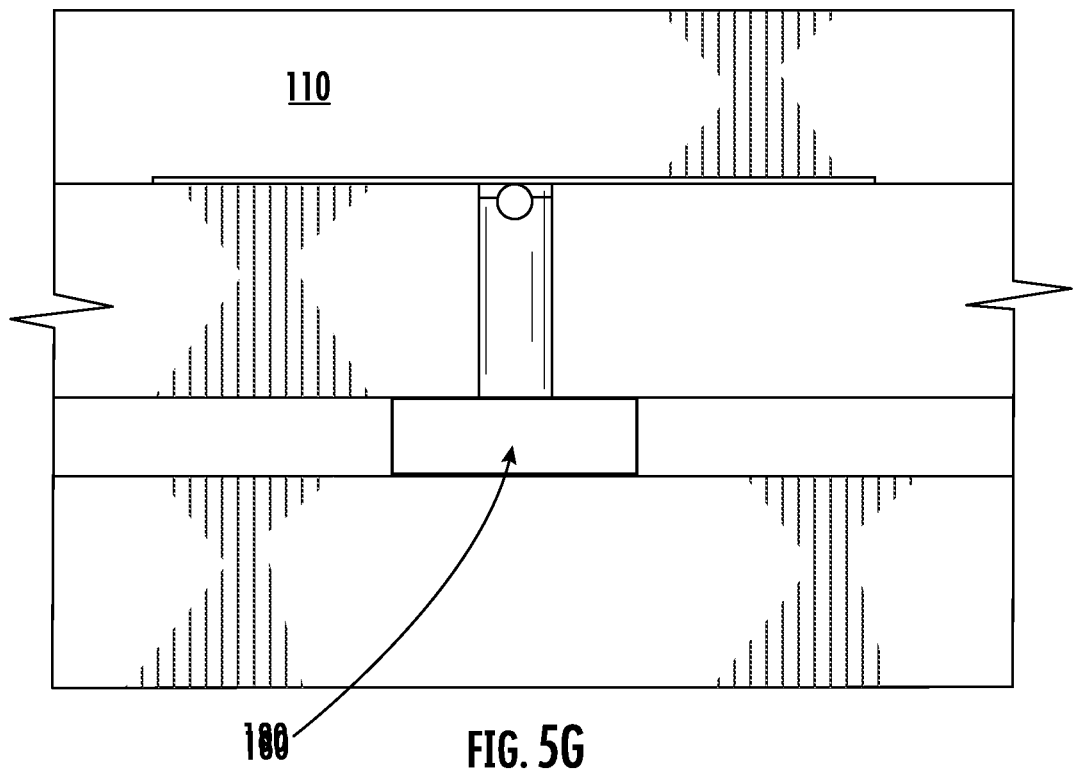

FIG. 5G illustrates a bottom view of a first sealing block of the sealing apparatus with the protective member removed, in accordance with some embodiments of the present disclosure.

Figure 6A:
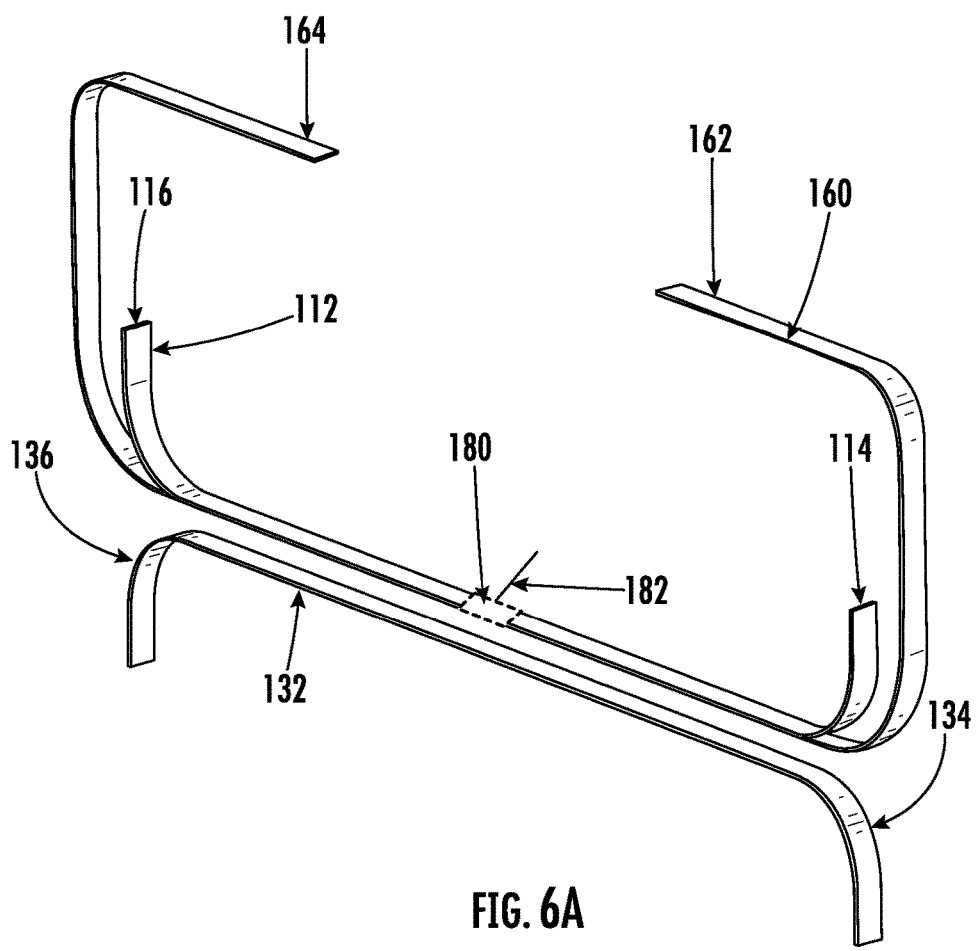

FIG. 6A illustrates a perspective view of a first heating element and a second heating element with the protective member, in accordance with some embodiments of the present disclosure.

Figure 6B:
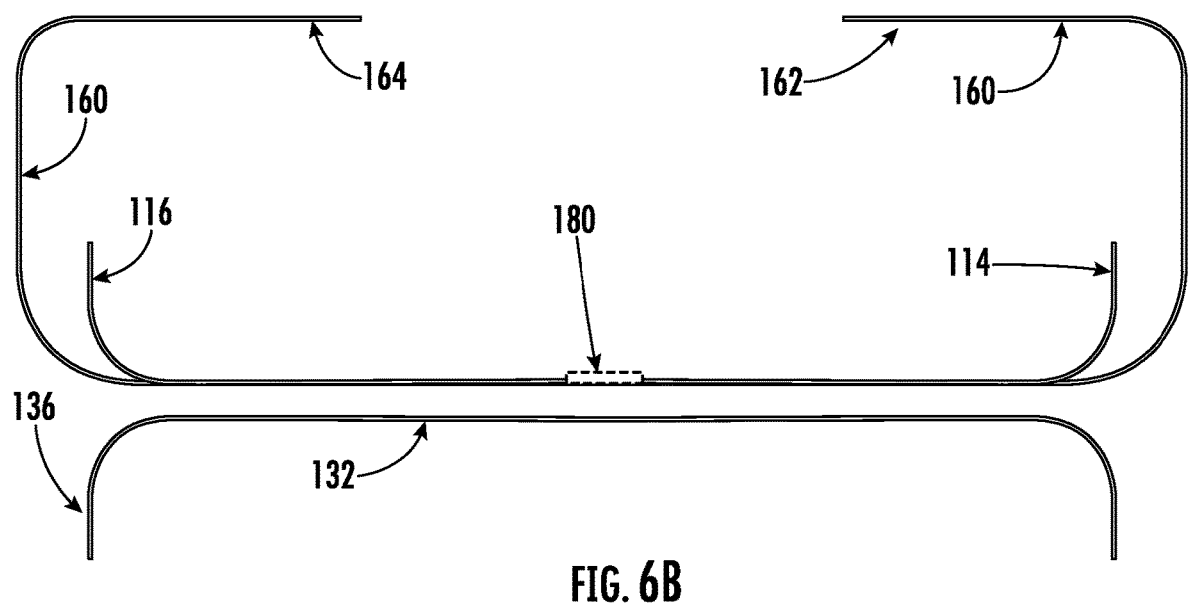

FIG. 6B illustrates a front view of a first heating element and a second heating element with the protective member, in accordance with some embodiments of the present disclosure.

Figure 7A:
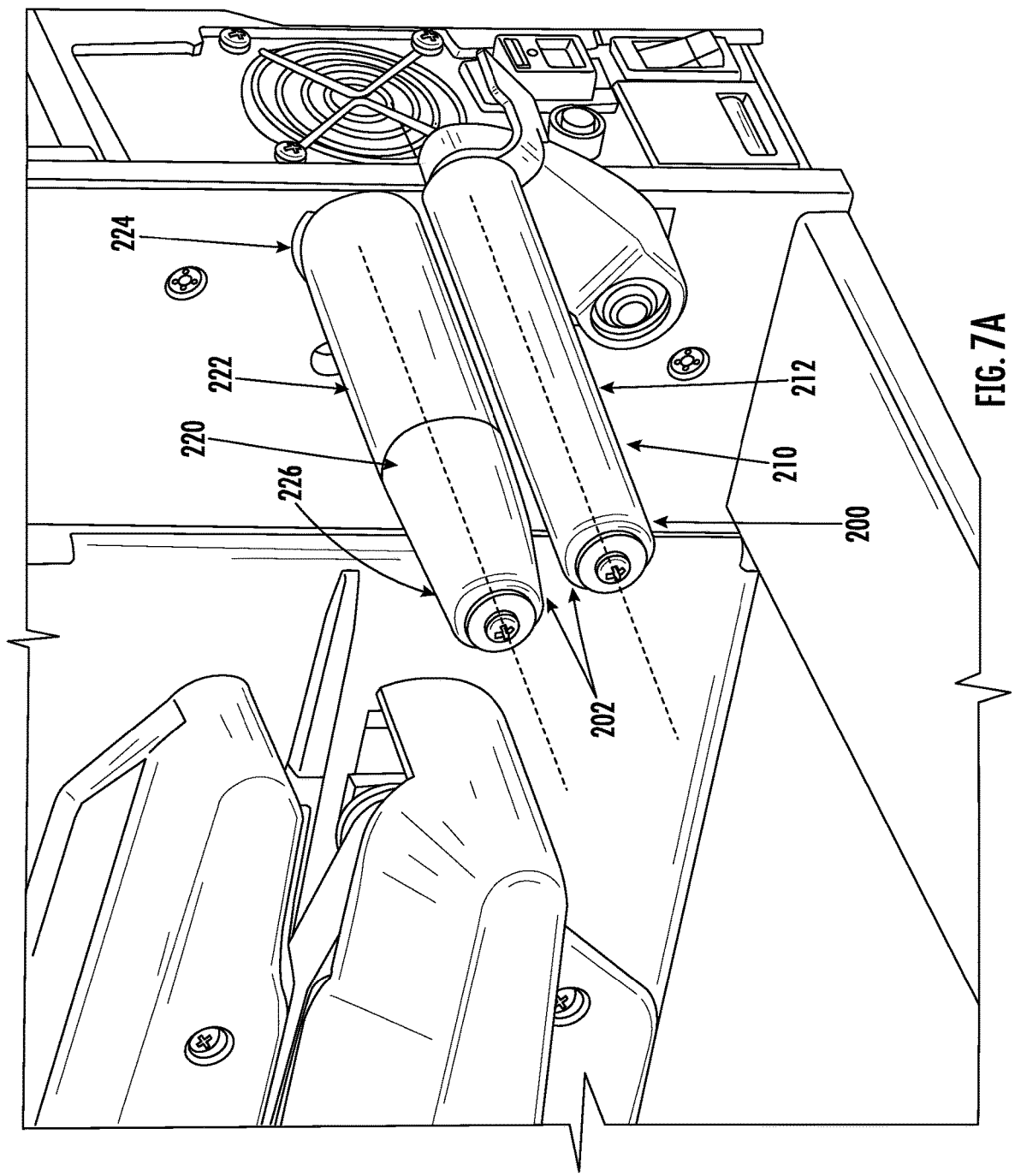

FIG. 7A illustrates a perspective view of the pinch roller apparatus, in accordance with some embodiments of the present disclosure.

Figure 7B:
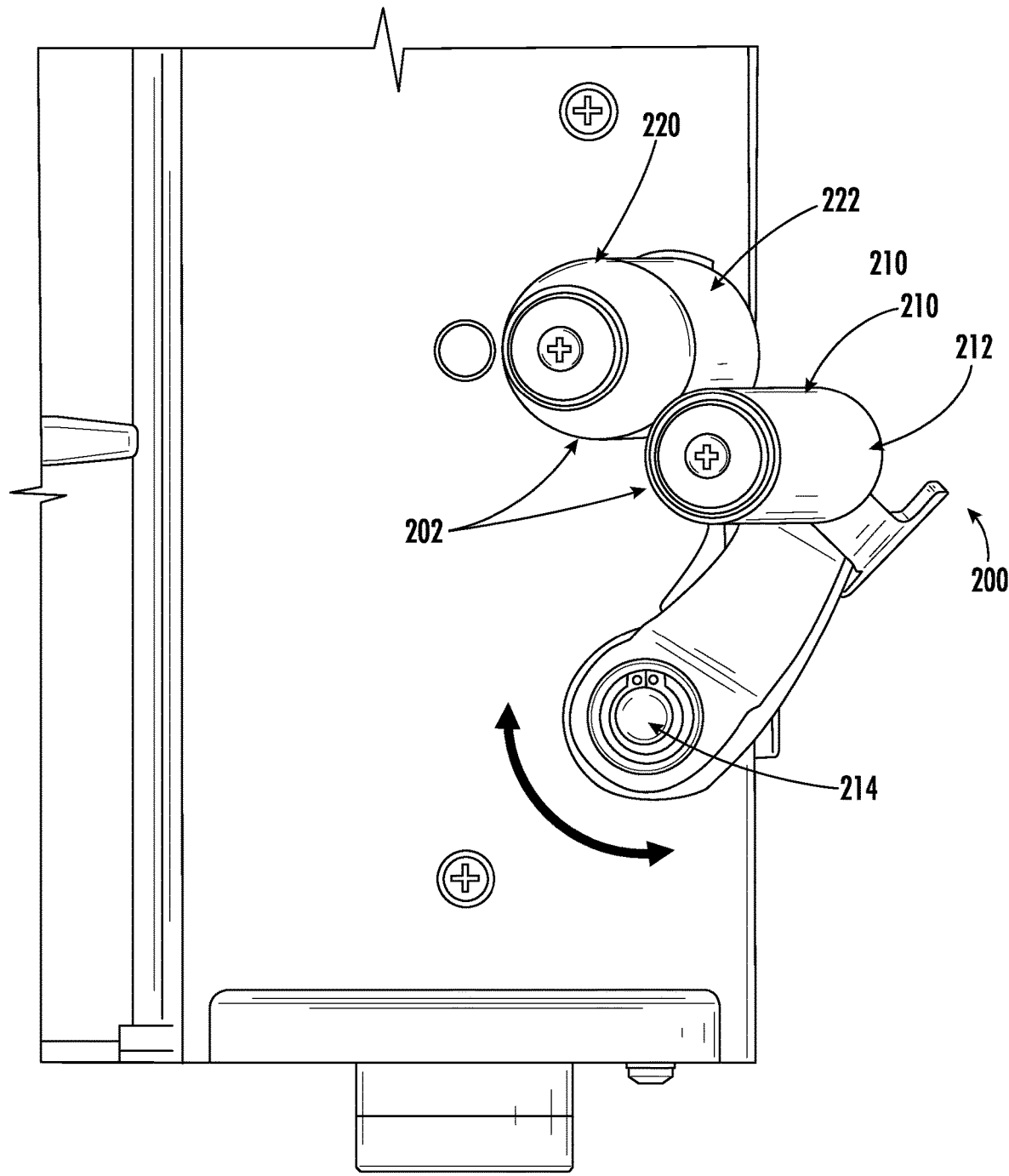

FIG. 7B illustrates a front view of the pinch roller apparatus, in accordance with some embodiments of the present disclosure.

Figure 7C:
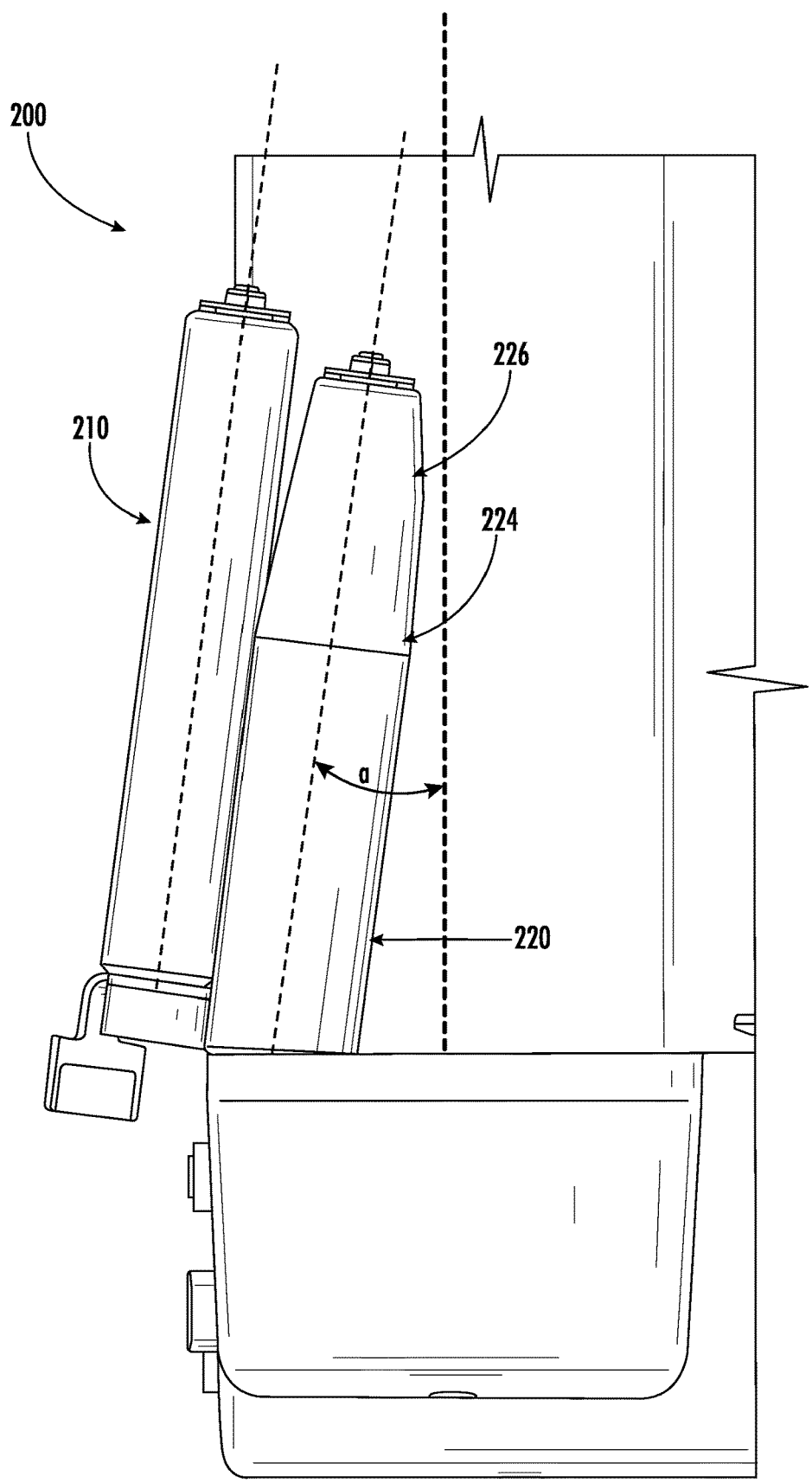

FIG. 7C illustrates a top view of the pinch roller apparatus with a supply roller removed, in accordance with some embodiments of the present disclosure.

Figure 7D:
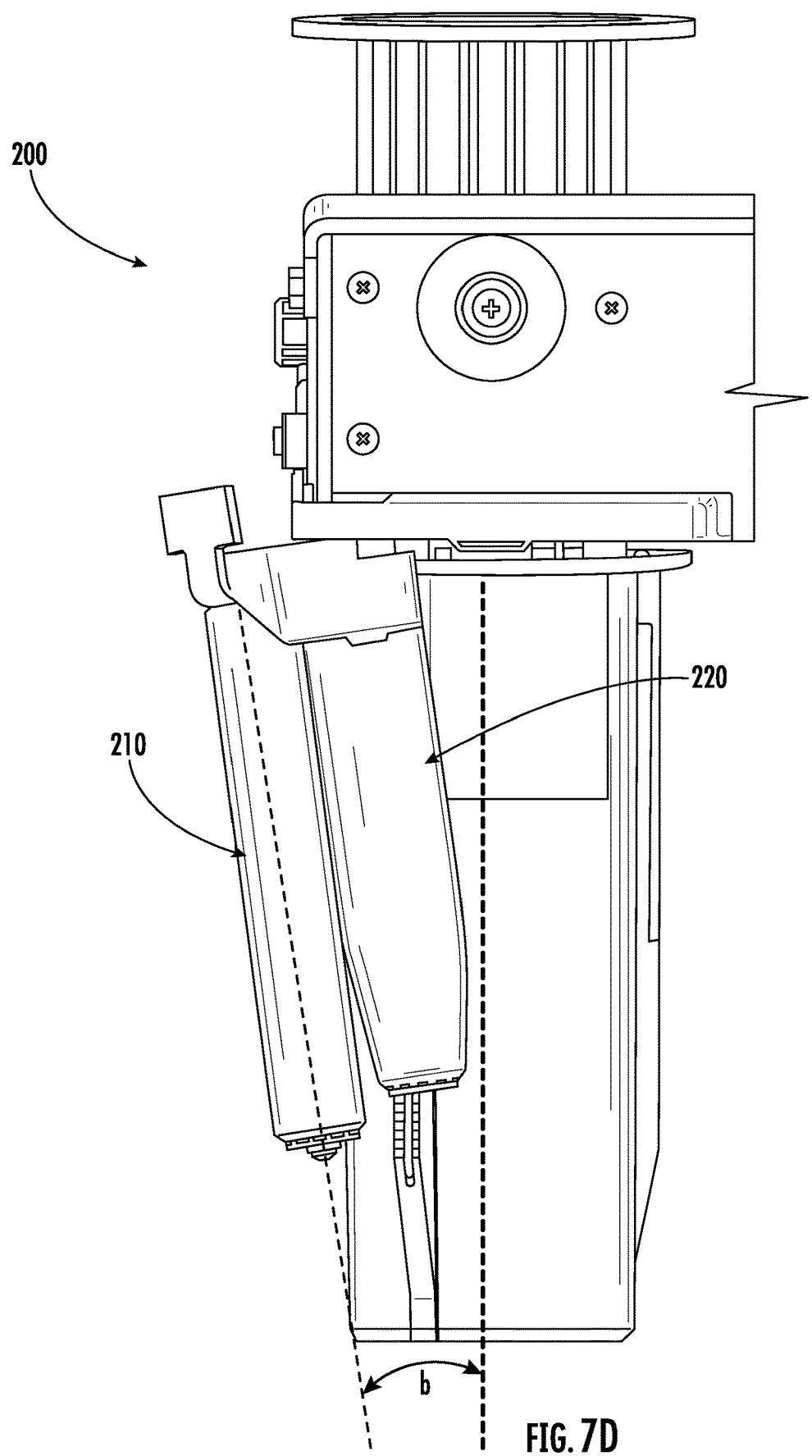

FIG. 7D illustrates a bottom view of the pinch roller apparatus, in accordance with some embodiments of the present disclosure.

Figure 8:
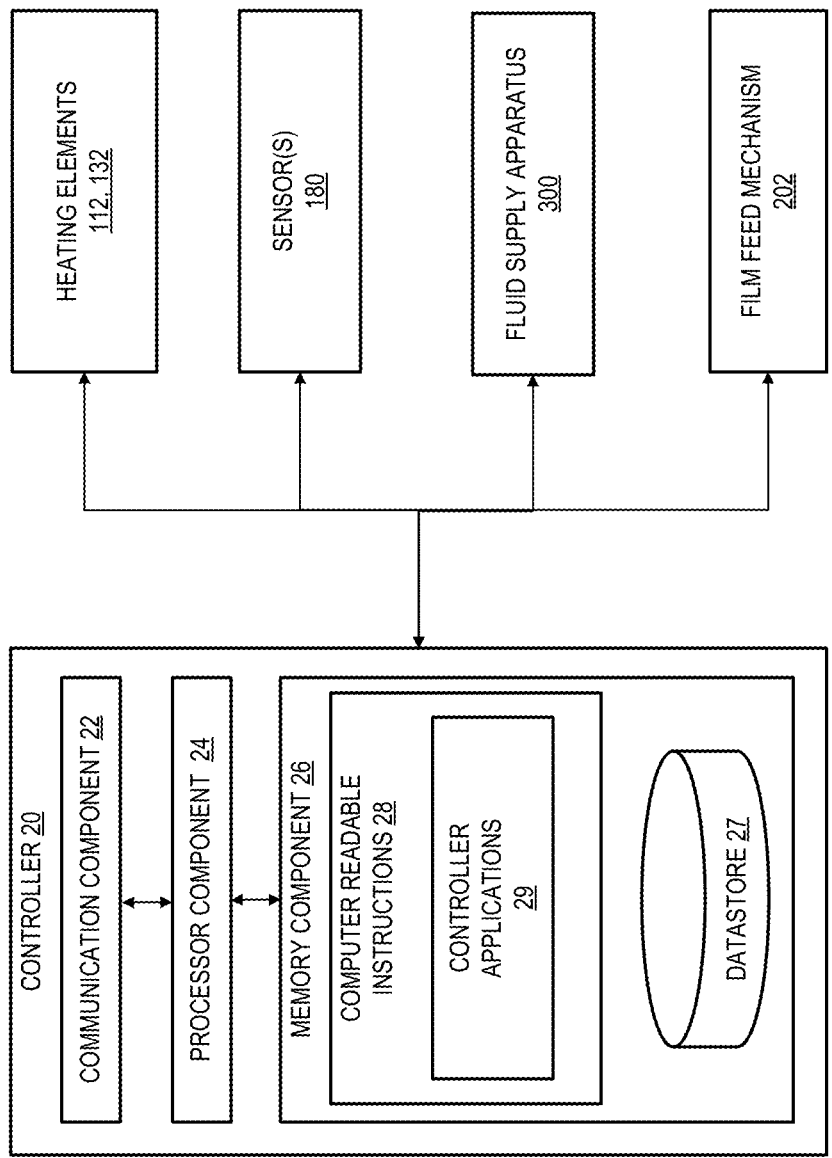

FIG. 8 illustrates a packaging apparatus system environment, in accordance with some embodiments of the present disclosure.

Figure 9:
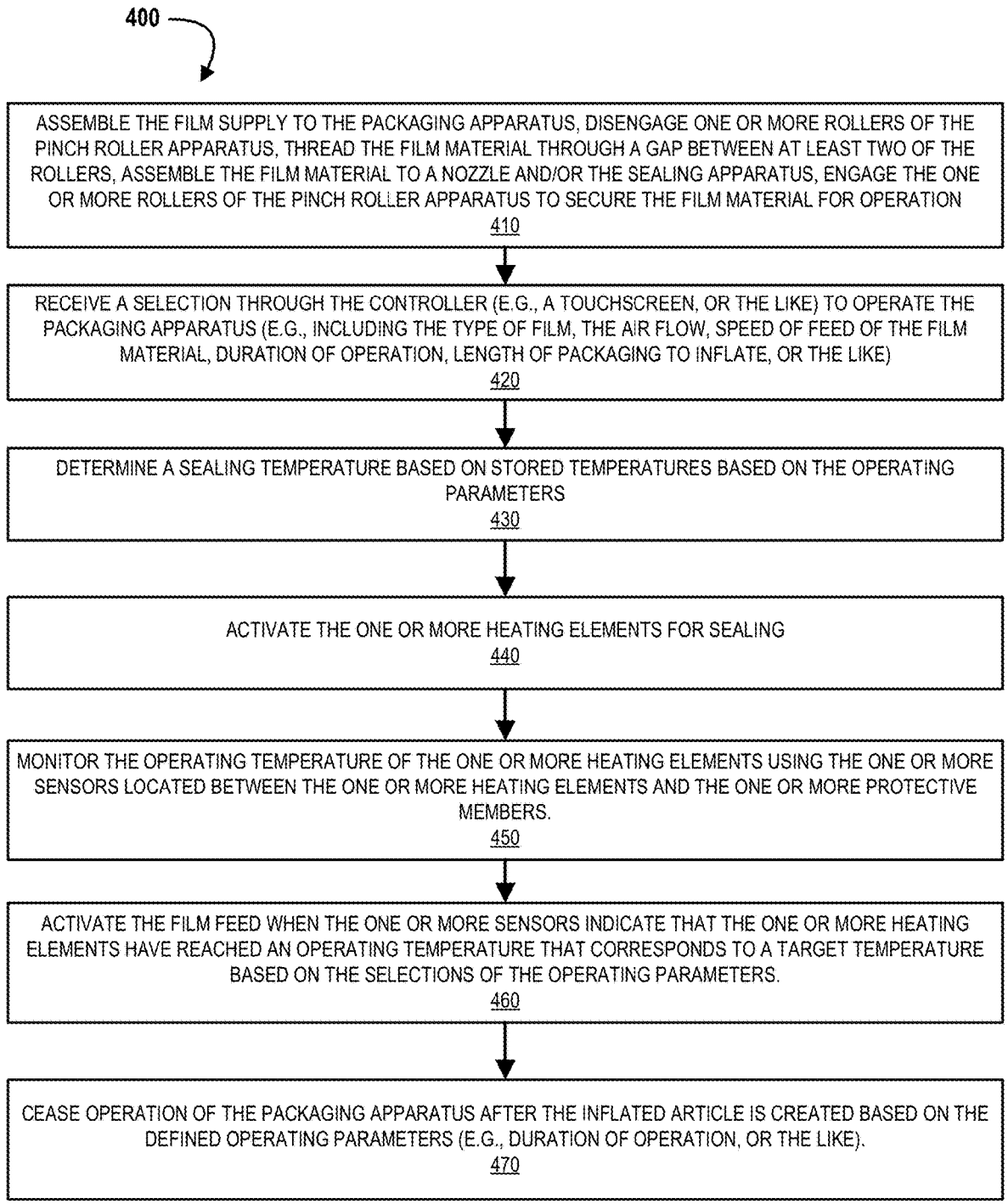

FIG. 9 illustrates a process flow for the operation of the packaging apparatus, in accordance with some embodiments of the present disclosure.

DETAILED DESCRIPTION

Embodiments of the present disclosure now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

FIGS. 1 through 7D illustrate some embodiments of a packaging apparatus 10 comprising a controller 20 (e.g., control panel touchscreen, or the like) a sealing apparatus 100, a pinch roller apparatus 200, a film supply roller 240, and/or fluid supply apparatus 300 (e.g., nozzle and/or blower apparatus, or the like), as well as other components of the packaging apparatus 10, as will be described herein. Generally, film material in a roll located on a film supply roller 240 will pass through the pinch roller apparatus 200, which will orient the film material and create a section of film material that can be inflated by the fluid supply apparatus 300. The fluid supply apparatus 300 may include a nozzle that is inserted into a fill channel of the film material. The nozzle and a blower operatively coupled to the nozzle may fill one or more chambers of the film material (e.g., directly or through the intermediate connection with one or more fill channels) with fluid in order to inflate the film material. A knife operatively coupled to the fluid supply apparatus 300 and/or the sealing apparatus 100 may be utilized to cut a portion of the film material such that the inflated film material may be passed into an inlet of a sealing apparatus 100, which is used to heat a portion of the inflated film material and melt the portion of the inflated seal material in order to seal the one or more chambers of the inflated seal material, thus forming the inflated packaging material.

With respect to the sealing apparatus 100, the sealing apparatus utilizes an improved sensor configuration (e.g., thermocouple configuration, or the like) in which a small sensor 180 is operatively coupled (e.g., spot welded, or the like) between a protective member 160 (e.g., a thermally conductive metal shim, or the like) and one or more heating elements 112, 132. Typical packaging apparatuses 10 have a problem capturing consistent temperature readings in order to accurately estimate the temperature in the sealing zone (e.g., heat sealing zone). The present invention locates the sensor in an improved location with a protective member 160 in order to more accurately capture temperature readings without damaging the sensor 180, as will be described in further detail herein.

The sealing zone is the zone within the sealing apparatus 100 adjacent one or more support members 110, 130 (e.g., between two heating blocks, or the like) that support the one or more heating elements 112, 132 (e.g., resistive heater wires, or the like) that are used to melt the film material. Typically, sealing designs may use the heating elements themselves to measure a temperature (e.g., using the resistance changes in the heating elements to estimate a temperature of the heating elements 112, 132), but theses designs include a lot of noise within the temperature readings, are difficult to calibrate, and/or do not account for external factors (e.g., heat sinks, or the like), and thus, do not provide an accurate temperature reading. Other types of typical designs attached a temperature sensor to the structural support block or utilize an infra-red (IR) sensor to measure belt temperatures. These types of designs also have reduced accuracy, and further have poor response times, both of which lead to low accuracy for temperature readings when compared with invention of the present disclosure, as will be discussed in further detail herein. Generally, the sealing apparatus 100 of the present disclosure uses a protective member (e.g., the thermocouple shim, or other like design) that allows for a more accurate temperature reading due to the close proximity of the sensor 180 in the sealing zone, and provides a response time within milliseconds, both of which allow the packaging apparatus 10 to ramp up quickly and maintain better control over the temperature in the sealing zone.

FIG. 2 illustrates a perspective view of the packaging apparatus 10 with sealing apparatus covers 12 removed exposing the sealing apparatus 100. Moreover, FIG. 3 illustrates a perspective view of the sealing apparatus 100 of the packaging apparatus 10. Furthermore, FIGS. 4A through 4E illustrate embodiments of a portion of the sealing apparatus 100. As illustrated in FIGS. 2 through 4E, the sealing apparatus 100 comprises a first support member 110 (e.g., a first sealing block, or the like) and a second support member 130 (e.g., a second sealing block). It should be understood that the first sealing block 110 may comprise a first heating element 112 operatively coupled to the first sealing block 110, while the second sealing block 130 may comprise a second heating element 132 operatively coupled to the second sealing block 130. In some embodiments the first heating element 112 and/or the second heating element 132 may comprise heating ribbons. It should be understood that while the heating elements 112, 132 are illustrated in the figures as a heating ribbons, the heating elements 112, 132 can be any type of heating element of any size and/or shape. The first sealing block 110 and/or the second sealing block 130 may include a channel 118, 138 (e.g., groove, embossment, or the like) in which the heating elements 112, 132 (e.g., heating ribbons, or the like) may be located. First ends 114, 134 and second ends 116, 136 of each heating element 112, 132 may be operatively coupled to the first sealing block 110 and the second sealing block 130, respectively, using a connector, such as a fastener 108 (e.g., a screw, bolt, rivet, or the like), as illustrated with respect to the second sealing block 130 illustrated in FIGS. 4A-4C.

In some embodiments of the invention at least one of the first sealing block 110 or the second sealing block 130 may comprise a protective member 160. The protective member 160 may be a shim, such as a ribbon shim (e.g., same or similar size as the heating ribbon, or the like), which may be utilized to cover at least a portion a first heating element 112 or a second heating element 132. The protective member 160 may be operatively coupled to the first sealing block 110 or the second sealing block 130 (e.g., depending on which sealing block has a sensor 180). In some embodiments, the protective member 160 may be operatively coupled to a sealing block 110, 130 using an adjustment member 168. The adjustment member 168 may be a biasing member (e.g., a spring, or the like) that may operatively couple a first end 162 of a protective member 160 to a second end 164 of a protective member 160. The adjustment member 168 may be utilized to account for heating and cooling of the protective member 160, which may cause expansion and/or contraction of the protective member 160. As such, the adjustment member 168 may compress when the protective member 160 is heated (and thus expands) and tensioned when the protective member cools (and thus contracts). In this way, the adjustment member 168 accounts for the heating and cooling cycles of the heating elements 112, 132 such that the protective member 160 remains operatively coupled to the sealing blocks 110, 130 and protects the sensor 180 during operation of the packaging apparatus 10. It should be understood that in some embodiments at least a portion of the protective member 160 is located within a channel 118, 138 of the sealing blocks 110, 130.

The sealing apparatus 100 further comprises a film feed mechanism 102. The film feed mechanism 102 may comprise a first feed mechanism 120 that is operatively coupled to the first sealing block 110. The first feed mechanism 120 may comprise a first belt 122 operatively coupled to one or more first belt rollers, such as one or more first belt drive rollers 124 and/or one or more first belt guide rollers 126. The film feed mechanism 102 may further comprise a second feed mechanism 140 that is operatively coupled to the second sealing block 130. The second feed mechanism 140 may comprise a second belt 142 operatively coupled to one or more second belt rollers, such as one or more second belt drive rollers 144 and/or one or more second belt guide rollers 146. It should be understood that the one or more first belt rollers and/or the one or more second belt rollers may drive the first belt 122 and the second belt 142 in order to pass the film material between the belts 122, 142 between the heating elements 112, 132 of the first sealing block 110 and the second sealing block 130.

A sensor 180 is operatively coupled between the protective member 160 and a heating element 112, 132. The sensor 180 may be a temperature sensor, such as thermocouple, that is located between the protective member 160 and a heating element 112, 132. For example, as illustrated in FIGS. 5D through 5G a single sensor 180 may be located between the first protective member 160 and the first heating element 112 of the first sealing block 110. Alternatively, in other embodiments, multiple sensors 180 may be located between the first protective member 160 and the first heating element 112 along different locations of the foregoing (e.g., along the length of the heating element ribbon and protective ribbon shim, or the like). In this way multiple sensors 180 may be used to determine the sealing temperature (e.g., at different locations, and average temperature, or the like). In still other embodiments, one or more sensors 180 may also be used between a second protective member (not illustrated) and the second heating element 132 of the second sealing block 130. The protective member 160 described herein is utilized, in part, to protect the sensor 180 from damage that might otherwise occur from the belts 122, 142 rubbing across the sensor 180 over time. As such, the protective member 160 is the component that interacts with the belts 122, 142 instead of the sensor 180.

In some embodiments, the one or more sensors 180 may be operatively coupled between the protective member 160 and the heating element 112, 132 through the use of a spot weld of the one or more sensors 180 to the protective member 160 and/or the heating elements 112, 132.

There are a number of issues with traditional film sealing devices, most notably, receiving accurate and timely temperature readings in order to accurately control the sealing of the film material in the heat sealing zone (e.g., in the gap between the first heating element 112 of the first heating block 132, and the second heating element 132 of the second heating block 130) has been an issue. As previously discussed herein, the typical ways of determining the temperature in the sealing zone may introduce noise into the temperature signal, be difficult to calibrate, and be unable to account for factors outside of the heating element (e.g., when using the change in resistance of the heating elements 112, 132 to determine a temperature reading). Moreover, attaching a sensor to the sealing block (e.g., near the inward face of the heating elements 112, 132), may result in inaccurate temperature readings because the sensor is located away from the sealing zone, and moreover, the sealing blocks 110, 130 may act as a heat sinks. Furthermore, using an IR sensor instead of a thermocouple to measure the temperature of the belts 122, 142 through which the film material is passed may also result in errors. That is, the belts are constantly being moved in and out of the sealing zone and may be heated and/or cooled as the belts move in and out of the heating zone and/or through friction of the belts against the one or more rollers of the film feed mechanism 102. As such, using an IR sensor to determine the temperature of the sealing zone may also provide for inaccurate readings. Moreover, the IR sensor readings may not be timely enough to make adjustments to the temperature of the heating elements as needed.

Alternatively, it should be understood that by locating the sensor 180 on the outside face of the heating element 112 the temperature registered by the sensor 180 is more accurate. As such, utilizing the sensor 180 between the heating element 112, 132 and the protective member 160 allows for much faster determination of the sealing temperature because the sensor remains close to the sealing zone. That is, the sensor 180 is closer to the film material upon sealing (e.g., as compared to a thermocouple sensor located on a support block). Moreover, the sensor 180 is located between two components (e.g., the heating elements 112 or 132 and the protective member 160), which have approximately the same temperature. That is, it should be understood that the protective member 160 may be made of a material that can quickly heat up and cool down as the same, or approximately the same, rate as the heating elements 112, 132. As such, heat sinks around the sensor 180 are avoided because the materials with which the one or more sensors 180 contact are the same as, or similar to, each other and/or to the temperature of the sealing zone in which the film material is sealed.

It should be understood that in some embodiments the sealing apparatus 100 may comprise the sealing blocks 110, 130 as described and illustrated herein. Moreover, the sealing apparatus 100 may utilize multiple heating elements 112, 132, one or more sensors 180 and/or one or more protective members 160. However, in other embodiments the sealing apparatus 100 may comprise a single sealing block 110 with a single heating element 112 to which one or more sensors 180 are operatively coupled and protected by the protective member 160.

Regardless of the configuration of the sealing apparatus 100, during operation, the film material may be feed through the sealing apparatus 100 through the use of the film feed mechanism 102. The heating elements 112, 132 may be engaged, such as by heating the heating elements 112, 132. The first sealing block 110 and the second sealing block 130 and/or the heating elements 112, 132 thereof may static, or alternatively, the first sealing block 110 and/or the second sealing block 130 and/or the heating elements 112, 132 thereof may be moved into position (e.g., one block or both blocks, or one heater or both heaters, may move towards and away from each other). For example, a component of the blocks 110, 130 may move the heating elements 112, 132 towards each other without moving the entire block 110, 130. In response to activating and/or moving the heating elements 112, 132 into position, the heating elements 112, 132 may melt at least a portion of the film material in order to seal the one or more chambers that have been filled with a fluid by the fluid supply apparatus 300.

In addition to the sealing apparatus 100, the packaging apparatus 10 may further comprise a pinch roller apparatus 200, which is used to provide an improved way to feed the film material to the sealing apparatus 100, which allows for more efficiently and effectively filing the one or more chambers of the film material. In general, the pinch roller apparatus 200 may receive film material from a film supply (e.g., a supply roller 240), and may compresses the film material as it passes through the pinch roller apparatus 200. This compression of the film restricts (e.g., stops, impedes, or the like) fluid from flowing within the film material past the pinch roller apparatus 200 back to the supply of film material, which could cause the film material to move around (e.g., slide off of a roll of film material, or the like) and not feed onto the sealing apparatus 100 correctly. Moreover, the pinch roller apparatus 200 creates a sealed portion of the film material such that a fluid supply assembly 300 (e.g., a nozzle and/or blower) can generate pressure to fill and expand the one or more chambers in the film material between the sealing apparatus 100 (or the fluid supply apparatus 300) and the pinch roller apparatus 200. As will be described in further detail herein, the geometry of the one or more rollers 202 (e.g., the one or more pinch rollers 212, the one or more guide rollers 222, or the like), and/or the orientation of the one or more rollers 202 with respect to the film supply (e.g., the orientation of the film supply roller 240) and/or with respect to the inlet of the sealing apparatus 100, may be used to evenly stretch the film material. For example, the film material may be stretched as the one or more chambers expand in order to allow for even tension of the film material, and to reduce the bunching (e.g., the folds, wrinkles, or the like) that can occur within the film material, both of which provide proper feeding of the film material to the fluid supply apparatus 200 and/or the sealing apparatus 100.

As illustrated in FIGS. 7A through 7D, the pitch roller apparatus 200 may comprise a plurality of rollers 202, such as first roller 210, a second roller 210, or the like. The first roller 210 may comprise a pinch roller 212, while the second roller 220 may comprise a guide roller 222. However, it should be understood that is some embodiments the first roller 210 and the second roller 220 may both be pinch rollers 212 (e.g., may both rotate around an arm as well as spin around a longitudinal axis). It should be understood that one or more of the rollers 202 may be moveable to allow for threading of the film material within the pinch roller apparatus 200. As illustrated in FIGS. 7A through 7D, a pinch roller 212 may be moveable, such as rotatable around a pivot 214 located a distance away from a longitudinal access of the pinch roller 212. Alternatively, the guide roller 222 may be static such that a longitudinal access of the guide roller 222 does not change position. Both the pinch roller 212 and the guide roller 222 may rotate around their longitudinal axes (e.g., spin), respectively.

In some embodiments, the one or more rollers 202 may have a uniform surface (e.g., cylindrical, or the like), a non-uniform surface, or the like. As illustrated in FIGS. 7A through 7D, a first roller 210 (e.g., a pinch roller 212) may have a uniform cylindrical surface, while a second roller 220 (e.g., a guide roller 222) may have a non-uniform surface that may include a portion that is diverging. For example, the non-uniform second roller 220 may have a uniform portion 224 (e.g., a cylindrical portion, or the like) and a non-uniform portion 226 (e.g., a diverging portion extending from the uniform portion 224). The non-uniform surface may include any type of surface, such as, a portion (or all of the roller) that may be converging, diverging, curved, angled, convex, concave, hyperbolic, parabolic, sinusoidal, or the like. While the illustrated embodiments indicate only one of the rollers 202 have a non-uniform surface, it should be understood that both, or neither, of the rollers 202 may have a non-uniform surface.

As previously referenced herein, the one or more rollers 202 may be positioned at an angled orientation with respect to the plane of the inlet of the sealing apparatus 100 and/or the longitudinal axis of the film supply roller 240 that holds a supply of film material (e.g., roll of film material). As illustrated in FIG. 7C the one or more rollers 202, in particular the second roller 220, may be orientated at an angle with respect to the longitudinal axis of the film supply roller 240 (and/or with respect to the plane of the inlet of the sealing apparatus 100). The "a" angle may be 1, 2, 3, 4, 5, 6, 7, 8, 9, 10, 12, 14, 16, 18, 20, 25, 30, 35, or other like degree. Moreover, the angle "a" may range between, overlap, fall within, or fall outside of any of these degree values. As illustrated in FIG. 7D, the one or more rollers 202, in particular the first roller 210, may be orientated at an angle with respect to the longitudinal axis of the film supply roller 240 (and/or with respect to the plane of the inlet of the sealing apparatus 100). The "b" angle may be 1, 2, 3, 4, 5, 6, 7, 8, 9, 10, 12, 14, 16, 18, 20, 25, 30, 35, or other like degree. Moreover, the angle "b" may range between, overlap, fall within, or fall outside of any of these degree values. It should be understood that the "a" angle and the "b" angle may be the same or different in various embodiments of the invention (e.g., based on the shapes of the rollers). For example, in some embodiments a first roller 210 may have a converging surface, while a second roller 220 may have a diverging surface. As such, in this embodiment while the longitudinal axes of the first roller 210 and the second roller 220 may be in plane (e.g., parallel) with the film supply (e.g., film supply roller 240) and/or the inlet of the sealing apparatus 100, the surfaces of the first roller 210 and the second roller 220 may change the angle of orientation of the film material such that it is out of plan with respect to the film material exiting the film supply (e.g., film supply roller 240) and/or the inlet of the sealing apparatus 100.

Consequently, regardless of the configuration of the first roller 210 and the second roller 220, the film material exiting a film supply on the film supply roller 240 may be located in the same plane (e.g., longitudinally parallel with the film supply roller 240) with the film material entering into the inlet of the sealing apparatus 100 (e.g., longitudinally parallel with the belts of the film feed mechanism 202. Alternatively, the film material passing through the pinch roller apparatus 200 is out of plane with respect to the longitudinal axis of the supply roller 240 and the plane of the belts 122, 142 in the sealing apparatus 100.

As illustrated in FIG. 8, the packaging apparatus 10 may further comprise a controller 20 that is used to operate the packaging apparatus 10, in accordance with some embodiments of the invention. The controller 20 may comprise one or more communication components 22, one or more processing components 24, and/or one or more memory components 26. The one or more processing components 24 are operatively coupled to the one or more communication components 22 and the one or more memory components 16. As used herein, the term "processing component" generally includes circuitry used for implementing the communication and/or logic functions of a particular system. For example, a processing component 24 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 24 may include functionality to operate one or more software programs based on computer-readable instructions 28 thereof, which may be stored in the one or more memory components 26.

The one or more processing components 24 use the one or more communication components 22 to communicate with an operator. The one or more communication components 22 may include a keypad, keyboard, touchscreen, touchpad, microphone, mouse, joystick, other pointer component, button, soft key, speaker, and/or other input/output component (s) for communicating with an operator through input and/or output signals. Alternatively, and/or additionally, the one or more communication components 22 may generally comprise a wireless transceiver, modem, server, electrical connection, electrical circuit, or other component for communicating with other components on the network 2. Additionally, and/or alternatively, the one or more communication components 22 may further include an interface that accepts one or more network interface cards, ports for connection of network components, Universal Serial Bus (USB) connectors, or the like to provide for a wired communication, removable device communication, or the like. As such, communication may be made with an operator through an operator computer system. The operator computer system may be a desktop, mobile device (e.g., laptop, smartphone device, PDA, tablet, or other mobile device), control station, or any other type of computer that generally comprises one or more communication components, one or more processing components, and one or more memory components. As such, an operator may communicate with the controller 20 of the packaging apparatus 10 directly (e.g., through a touchscreen, or the like) or indirectly (e.g., through an operator mobile device) in order to operate the controller 20.

The controller 20 may have computer-readable instructions 28 stored in the one or more memory components 26, which in one embodiment includes the computer-readable instructions 28 for controller applications 29, such as dedicated applications (e.g., apps, applet, or the like), portions of dedicated applications, a web browser or other apps that allow an operator to take various actions, including allowing the operator to control the packaging apparatus 10 through the controller 20. For example, the operator may select the type of film material (e.g., pillow cushions, bubble wrap, or the like), the velocity of fluid to fill the one or more chambers of the film material, the speed at which the film material will pass through the sealing apparatus 100, the time at which the packaging apparatus 10 will run, or the like. It should be understood that the operating parameters that may be selected by an operator may be stored in a datastore 27 and accessed by the controller application 29.

As illustrated in FIG. 8, the controller 20 is operatively coupled to the one or more heating elements 112, 132, the one or more sensors 180, the fluid supply apparatus 300 (e.g., a blower, or the like operatively coupled to the nozzle), and/or the film feed mechanism 202 (e.g., a motor thereof), and is configured to send information to and/or receive information from each of the foregoing and/or other components in order to operate the packaging apparatus 10 as described herein.

FIG. 9 illustrates a process flow 400 for the operation of the packaging apparatus 10. As illustrated by block 410 in FIG. 9 the film supply (e.g., roll of film) is assembled onto the film supply roller 240. Moreover, a first roller 210, such as the pinch roller 212, may be moved away from (e.g., pivoted away from) a second roller 220, such as the guide roller 222, in order to create a gap (e.g., a space, or the like) between the first roller 210 and the second roller 220. The film material may be pulled away from the film supply (e.g., unroll the film roll, or the like) and threaded through the space between the first roller 210 and the second roller 220. The film material may then be operatively coupled to the nozzle and/or the sealing apparatus 100. For example, at least a portion of the film material may be slid over the nozzle. That is, a fill channel within the film material is slid over the end of the nozzle and at least a portion of the film material (e.g., an end of the film material) is inserted into the inlet of the sealing apparatus 100. The first roller 210 (e.g., the pinch roller 212) may be moved back towards the second roller 220 (e.g., the guide roller 222) to pinch the film material between the first roller 210 and the second roller 220.

Block 420 of FIG. 9 illustrates that the controller 20 of the packaging apparatus 10 receives a selection of one or more operating parameters for the operation of the packaging apparatus 10 (e.g., through a touchscreen, or the like). For example, an operator may select the type of film material being used (e.g., cushion pillows, bubble wrap, or the like), a film material size (e.g., thickness, or the like), the fluid flow (e.g., air flow volume and/or air speed provided by the blower and/or exiting the nozzle outlet) for filling the one or more chambers of the film material, the speed of the feed of the film material into the sealing apparatus 100 (e.g., speed of the film feed mechanism 102), the duration of the operation of the packaging apparatus (e.g., time of operation), the length of the film material to inflate (e.g. feet, yards, or the like), or other like operating parameters of the packaging apparatus 10. The operator may input the operating parameters into the controller 20 (e.g., through a touchscreen) such that the controller 20 may operate the packaging apparatus 10 in accordance with the inputted operating parameters.

Block 430 of FIG. 9 illustrates that a sealing temperature for the sealing apparatus 100 is determined for the operation of the sealing apparatus 100 based on the operating parameters selected by the operator, as described with respect to block 420 of FIG. 9. It should be understood that the sealing temperature at which to seal the film material is based on stored temperature values that are determined based on the operating parameters input into the sealing apparatus 100. For example, the sealing temperature may be looked up in a reference table based on the selection of the film material type, the film thickness, the fluid flow, duration of the operation of the packaging apparatus, the length of film material to inflate, and/or the like.

FIG. 9 further illustrates in block 440 that the packaging apparatus 100 is activated for operation based on the selected operating parameters, as described with respect to blocks 420 and 430 of FIG. 9. That is, the controller 20 first activates the one or more heating elements 112, 132 in order to heat the one or more heating elements 112, 132 to the determined sealing temperature.

Block 450 of FIG. 9 illustrates that the controller 20 may monitor the temperature reading of the one or more sensors 180 (e.g., located between the one or more heating elements 112, 132 and the one or more protective members 160), and thus, the temperature of the one or more heating elements 112, 132 and/or the sealing zone in which the film material will be sealed. The controller 20 monitors the temperature reading of the one or more sensors 180 in order to determine when the packaging apparatus 10 is ready to inflate the one or more chambers of the film material and seal the one or more chambers.

FIG. 9 further illustrates in block 460 that once the sealing temperature determined by the controller 20, as described with respect to block 430, meets the operating temperature measured by the one or more sensors 180, the fluid supply apparatus 300 (e.g., the blower) and/or the film feed mechanism 102 are activated. For example, the fluid supply apparatus (e.g., blower) will begin to inflate the one or more chambers of the film material, and the film feed mechanism 102 will begin to feed the film material into the sealing apparatus 100 to seal the one or more chambers that have been inflated by the fluid supply apparatus 300 (e.g., blower and nozzle). Additionally, the controller 20 will continue to monitor the readings from the one or more sensors 180, and thereafter, adjust the one or more heating elements 112, 132 should the operating temperature not meet the sealing temperature (or fall within a range for the sealing temperature).

Block 370 of FIG. 9 further illustrates that once the packaging apparatus 10 has inflated the film material and sealed the one or more inflated chambers of the fill material to form the inflated article (e.g., packaging material) in accordance with the operating parameters entered into the controller 20, the operation of the packaging apparatus 10 may be ceased.

The present invention provides improvements over traditional packaging apparatuses, due at least in part to the improved sealing apparatus 100 and the pinch roller apparatus 200. As such, due to the shape of the one or more rollers 202 and/or angle of orientation of the one or more rollers 202 with respect to the plane of the film material being received from the film supply (e.g., film supply roller 240) and/or the film material being feed into to the inlet of the sealing apparatus 100, improved filling of the one or more chambers may be achieved. For example, the film entering and exiting the pinch roller apparatus 200 may be twisted out of plane with respect to the orientation of the film material being received from the film supply (e.g., film supply roll 240) and/or the film material being fed into to the inlet of the sealing apparatus 100. As previously discussed herein, the pinch assembly 100 stretches out the film material to restrict bunching (e.g. folding, wrinkling, or the like) of the film material before being filled with fluid and/or sealed. Moreover, the sealing apparatus 100 of the present disclosure provides an improved sealing of the one or more inflated chambers by more accurately determining the sealing temperature within the sealing zone in order to more accurately control the sealing of the one or more chambers to provide a desired seal within the inflated fill material. It should be understood that by more accurately being able to measure the temperature of the sealing zone, the sealing apparatus 100 may avoid over-heating and/or under-heating of the film material, either of which could result in an improper seal of the one or more chambers. An improper seal may be an underseal (e.g., the film material is unsealed) or an overseal (e.g., the film material is over melted such that burn through of the film material occurs), both of which could result in fluid leaking from the one more of the chambers, and thus, resulting in defective packaging material.

It should be understood, that the systems, devices, and components described in herein may be configured to operate through the use of the controller 20 and/or the components thereof by establishing an electronic communications link between components and sending signals in order to accomplish the steps of the processes described herein. Moreover, it should be understood that the process flows described herein include transforming the information sent to and/or received from the controller application 29 from one or more data formats into a data format associated with each individual component. There are many ways in which information is converted within the controller 20. This may be seamless, as in the case of receiving continuous information. Alternatively, the conversion may require processing by the use of a special conversion program, or it may involve a complex process of going through intermediary stages, or involving complex "exporting" and "importing" procedures, which may convert to and from a tab-delimited or comma-separated text files. In some cases, the operator application 29 may recognize several data file formats at the data input stage and then is also capable of storing the output data in a number of different formats. Such an operator application 29 may be used to convert a file format. If the source format or target format is not recognized, then at times a third program may be available which permits the conversion to an intermediate format, which can then be reformatted by the operator application 29.

As will be appreciated by one of skill in the art, the present disclosure may be embodied as a method (including, for example, a computer-implemented process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, etc.), or an embodiment combining software and hardware aspects that may generally be referred to herein as a "system." Furthermore, embodiments of the present disclosure may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described above with reference to flowchart illustrations and/or block diagrams of methods, apparatuses (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present disclosure are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely provide conceptual delineations between components and that one or more of the components illustrated by a block in the block diagrams may be combined or share hardware and/or software with another one or more of the components illustrated by a block in the block diagrams. Likewise, a component, device, system, apparatus, and/or the like may be made up of one or more components, devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will be understood that, where possible, any of the advantages, features, functions, devices, and/or operational aspects of any of the embodiments of the present disclosure described and/or contemplated herein may be included in any of the other embodiments of the present disclosure described and/or contemplated herein, and/or vice versa.

Where possible, any terms expressed in the singular form herein are meant to also include the plural form and/or vice versa, unless explicitly stated otherwise. Accordingly, the terms "a" and/or "an" shall mean "one or more." As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Moreover, it should be understood that "operatively coupled," when used herein, means that the components may be formed integrally with each other, or may be formed separately and coupled together. Furthermore, "operatively coupled" means that the components may be coupled directly to each other, or to each other with one or more components located between the components that are operatively coupled together. Furthermore, "operatively coupled" may mean that the components are detachable from each other, or that they are permanently coupled together.

Furthermore, certain terminology is used herein for convenience only and is not to be taken as a limiting, unless such terminology is specifically described herein for specific embodiments. Indeed, the components may be oriented in any direction and the terminology, therefore, should be understood as encompassing such variations unless specified otherwise. The terminology includes the words specifically mentioned herein, derivatives thereof and words of similar import. For example, words such as "vertical," "horizontal," "longitudinal," "top," "bottom," "side," "upper," "lower," or the like are used to describe the orientation of the components described herein.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A packaging apparatus, the apparatus comprising:
 a film supply member having a supply longitudinal axis, wherein the film supply member is configured to support a spool of film material that rotates around the supply longitudinal axis of the film supply member;
 a nozzle apparatus that inflates the film material;
 a sealing apparatus comprising:
  a support member;
  a heating element operatively coupled to the support member;
  a protective member operatively coupled to the heating element or the support member, wherein the protective member is operatively coupled to the heating element or the support member using an adjustment member, and wherein the protective member is a shim; and
  a sensor operatively coupled to the heating element or the protective member and located between the heating element and the protective member; and
  a film feeding component, wherein the film feeding component is configured to feed a film material past the heating element, and wherein the sensor is configured to determine a temperature of sealing of one or more chambers of the film material.

2. The apparatus of claim 1, wherein the sensor is a temperature sensor thermocouple.

3. The apparatus of claim 1, wherein the protective member interacts with the film material to seal the film material.

4. The apparatus of claim 1, wherein the protective member expands and contracts as a temperature of the heating element increases and decreases, and wherein the adjustment member adjusts the protective member due to heating and cooling of the protective member.

5. The apparatus of claim 1, wherein the adjustment member is a spring.

6. The apparatus of claim 1, wherein the support member comprises a first support member and the heating element is a first heating element, and wherein the apparatus further comprises:
 a second support member, wherein the second support member comprises a second heating element; and
 wherein the film material passes between the protective member and the second heating element to seal the one or more chambers of the film material.

7. The apparatus of claim 1, wherein the film feeding component comprises a first belt, a second belt, and one or more drive mechanisms, wherein the one or more drive mechanisms drive the first belt or the second belt to move the film material through the sealing apparatus.

8. A sealing apparatus, the apparatus comprising:
 a support member;
 a heating element operatively coupled to the support member;
 a protective member operatively coupled to the heating element or the support member, wherein protective member is operatively coupled to the heating element or support member using an adjustment member, wherein the protective member is a shim;
 a sensor operatively coupled to the heating element or the protective member and located between the heating element and the protective member; and
 a film feeding component, wherein the film feeding component is configured to move a film material past the heating element, and wherein the sensor is configured to determine a temperature of sealing of one or more chambers of the film material.

9. The apparatus of claim 8, wherein the sensor is a temperature sensor.

10. The apparatus of claim 9, wherein the temperature sensor is a thermocouple.

11. The apparatus of claim 8, wherein the protective member interacts with the film material to seal the film material.

12. The apparatus of claim 8, wherein the protective member expands and contracts as a temperature of the heating element increases and decreases, and wherein the adjustment member adjusts the protective member due to heating and cooling of the protective member.

13. The apparatus of claim 8, wherein the adjustment member is a spring.

14. The apparatus of claim 8, wherein the support member comprises a first support member and the heating element is a first heating element, and wherein the apparatus further comprises:
   a second support member, wherein the second support member comprises a second heating element; and
   wherein the film material passes between the protective member and the second heating element to seal the one or more chambers of the film material.

15. The apparatus of claim 8, wherein the film feeding component comprises a first belt, a second belt, and one or more drive mechanisms, wherein the one or more drive mechanisms drive the first belt or the second belt to move the film material through the sealing apparatus.

16. A method of operating a package apparatus, the method comprising:
   feeding a film material from a film supply member to a nozzle apparatus;
   inflating one or more chambers of the film material with a fluid using the nozzle apparatus;
   feeding the film material through a sealing apparatus, wherein the sealing apparatus comprises:
      a support member;
      a heating element operatively coupled to the support member;
      a protective member operatively coupled to the heating element or the support member, wherein the protective member is operatively coupled to the heating element or the support member using an adjustment member, and wherein the protective member is a shim; and
      a sensor operatively coupled to the heating element or the protective member and located between the heating element and the protective member; and
      a film feeding component, wherein the film feeding component is configured to feed the film material past the heating element, and wherein the sensor is configured to determine a temperature of sealing of the one or more chambers of the film material; and
   sealing the one or more chambers of the film material using the sealing apparatus.

17. The method of claim 16, wherein the sensor is a temperature sensor thermocouple.

18. The method of claim 16, wherein the protective member interacts with the film material to seal the film material.

19. The method of claim 16, wherein the protective member expands and contracts as a temperature of the heating element increases and decreases, and wherein the adjustment member adjusts the protective member due to heating and cooling of the protective member.

20. The method of claim 16, wherein the adjustment member is a spring.

* * * * *